United States Patent
Joseph et al.

(10) Patent No.: US 11,647,261 B2
(45) Date of Patent: May 9, 2023

(54) ELECTRICAL DEVICES CONTROL BASED ON MEDIA-CONTENT CONTEXT

(71) Applicant: SONY CORPORATION, Tokyo (JP)

(72) Inventors: Jaison Joseph, Bangalore (IN); Anil Sasidharan, Bangalore (IN)

(73) Assignee: SONY CORPORATION, Tokyo (JP)

( * ) Notice: Subject to any disclaimer, the term of this patent is extended or adjusted under 35 U.S.C. 154(b) by 209 days.

(21) Appl. No.: 16/693,124

(22) Filed: Nov. 22, 2019

(65) Prior Publication Data

US 2021/0160588 A1 May 27, 2021

(51) Int. Cl.
| | |
|---|---|
| *H04N 21/845* | (2011.01) |
| *H04N 21/2543* | (2011.01) |
| *H04N 21/466* | (2011.01) |
| *H04N 21/478* | (2011.01) |

(52) U.S. Cl.
CPC ..... *H04N 21/8456* (2013.01); *H04N 21/2543* (2013.01); *H04N 21/466* (2013.01); *H04N 21/478* (2013.01)

(58) Field of Classification Search
CPC ........... H04N 21/8456; H04N 21/2543; H04N 21/46; H04N 21/478
See application file for complete search history.

(56) References Cited

U.S. PATENT DOCUMENTS

| | | | |
|---|---|---|---|
| 8,928,812 B2 | 1/2015 | Li et al. | |
| 2007/0126927 A1 | 6/2007 | Yun | |
| 2010/0037264 A1* | 2/2010 | Hardacker | ....... H04N 21/44224 |
| | | | 707/E17.022 |
| 2012/0151413 A1* | 6/2012 | Nurmi | ................. G06F 3/04883 |
| | | | 715/825 |
| 2013/0103703 A1 | 4/2013 | Han | |
| 2013/0215107 A1* | 8/2013 | Kimura | ..................... G06T 7/50 |
| | | | 345/419 |
| 2013/0343597 A1* | 12/2013 | Kocks | .................. G06F 16/738 |
| | | | 382/100 |

(Continued)

FOREIGN PATENT DOCUMENTS

| | | |
|---|---|---|
| CN | 106028065 A | 10/2016 |
| KR | 20160092299 A | 8/2016 |

OTHER PUBLICATIONS

Jeong Do Kim et al: "Development Display and Its Authoring Tool", ETRI JOurnal, vol. 37, No. 1, Feb. 1, 2015 (Feb. 1, 2015), XP055754651, KR ISSN: 1225-6463, DOI: 10.4218/etrij.15.0113.0078 Feb. 1, 2015 (Feb. 1, 2015, XP055754651, KR ISSN: 1225-6463, DOI:10.4218/etrij.15.0113.0078 *the whole document*.

(Continued)

*Primary Examiner* — Sunghyoun Park
(74) *Attorney, Agent, or Firm* — Chip Law Group

(57) ABSTRACT

A metadata server that includes circuitry is provided. The circuitry receives a first segment from a plurality of segments of first media content and determines context information associated with the first segment based on a characteristic of at least one frame of a plurality of frames included in the first segment. The circuitry generates first metadata associated with the first segment based on the context information. The first metadata includes timing information corresponding to the determined context information to control a first set of electrical devices. The circuitry further transmits the received first segment and the generated first metadata to a media device associated with the first set of electrical devices.

20 Claims, 7 Drawing Sheets

(56) References Cited

U.S. PATENT DOCUMENTS

| | | | |
|---|---|---|---|
| 2017/0031559 A1* | 2/2017 | Lee | G06F 3/14 |
| 2017/0238055 A1* | 8/2017 | Chang | H04N 21/4662 |
| | | | 725/19 |
| 2017/0257664 A1* | 9/2017 | Tam | H04N 21/6332 |
| 2017/0266676 A1 | 9/2017 | Fateh | |
| 2017/0270365 A1* | 9/2017 | Laska | H04N 5/145 |
| 2018/0343505 A1* | 11/2018 | Loheide | H04N 21/8545 |
| 2019/0019033 A1 | 1/2019 | Chang | |
| 2019/0166674 A1* | 5/2019 | Mason | H04N 21/8133 |
| 2019/0215582 A1 | 7/2019 | Tennakoon | |
| 2020/0169782 A1* | 5/2020 | Ribeiro De Oliveira | |
| | | | H04N 21/242 |
| 2020/0204867 A1* | 6/2020 | Dalbec | G06T 7/246 |
| 2020/0327160 A1* | 10/2020 | Hsieh | H04N 21/26603 |

OTHER PUBLICATIONS

Park, et al., "A Framework of Sensory Information for 4-D Home Theater System", Applied Mathematics & Information Sciences, vol. 6, No. 1, Jan. 2012, pp. 201S-207S.

"World's Largest Modular TV, a Unified IoT Experience and a 'Digital Cockpit' for the Connected Car", Samsung Newsroom, retrieved from: https://news.samsung.com/us/recap-press-conference-modular-tv-unified-iot-experience-digital-cockpit-connected-car, Jan. 9, 2018, 3 pages.

John Anon, "Android TV: Internet of Things Integration In The Pipeline?", Android Headlines, retrieved from: https://www.androidheadlines.com/2015/11/android-tv-internet-things-integration-pipeline.html, Nov. 20, 2015, 2 pages.

* cited by examiner

ELECTRICAL DEVICES CONTROL BASED ON MEDIA-CONTENT CONTEXT

CROSS-REFERENCE TO RELATED APPLICATIONS/INCORPORATION BY REFERENCE

None.

FIELD

Various embodiments of the disclosure relate to media content creation and rendering. More specifically, various embodiments of the disclosure relate to an apparatus and a method for electrical devices control based on media-content context.

BACKGROUND

Recent advancements in the field of media content reproduction has led to a proliferation of media devices capable of playing-back media content. In certain situations, the media device may have the capability to control one or more smart household devices (such as light, fans, blinds, or furniture). Typically, such smart household devices may be controlled by the media devices based on manual inputs or predefined conditions (for example predefined schedules). In certain situations, the control of the smart household devices may not be resonant with a context of the media content that may be played back by the media device, which may further affect user experience. Thus, there is a need of a smart and intelligent system, which may enhance the user experience, during the control of the smart household devices by the media devices.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An apparatus and a method for electrical devices control based on media-content context, are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
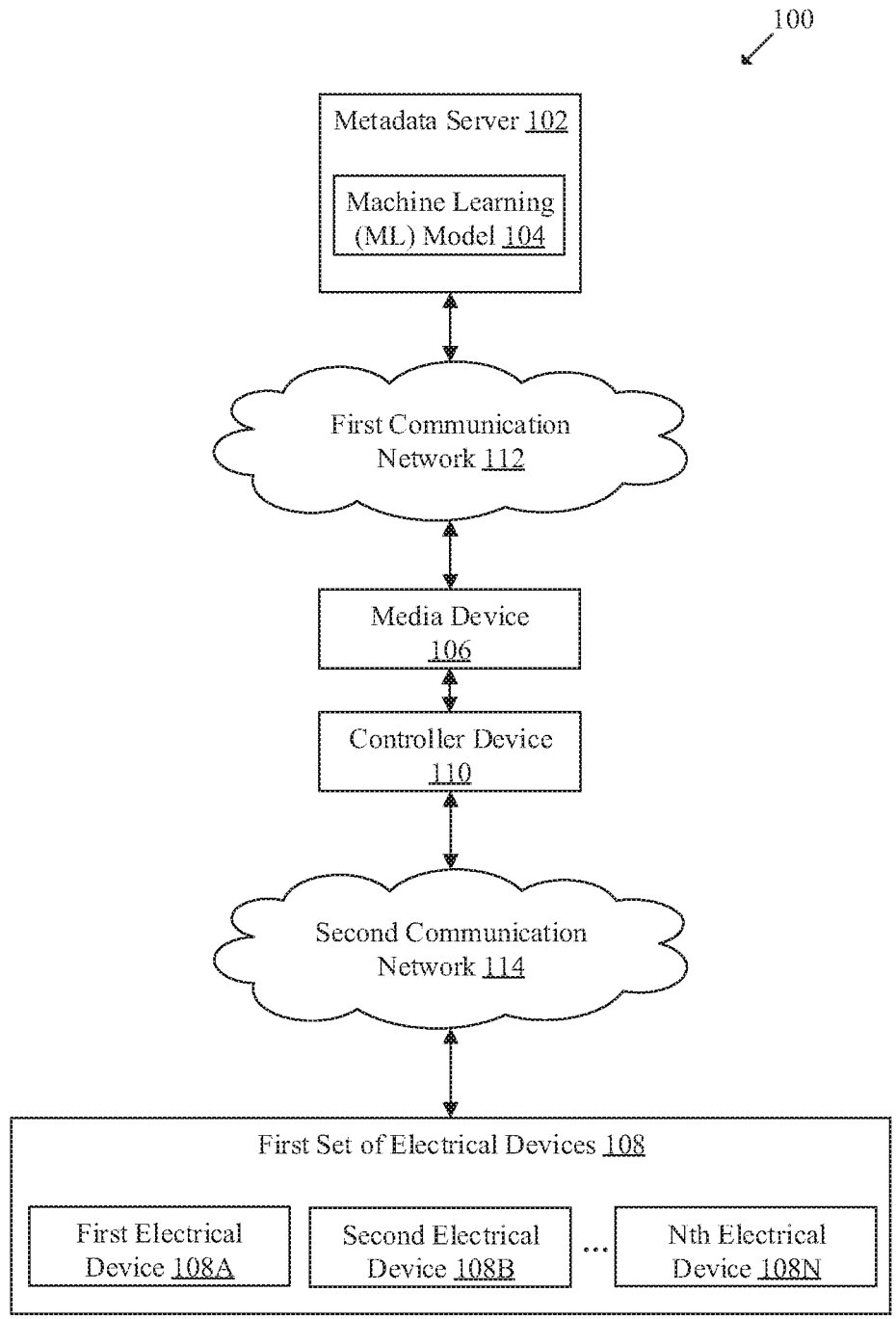
FIG. 1 is a block diagram that illustrates an exemplary network environment for control of electrical devices based on context information of media content, in accordance with an embodiment of the disclosure.

The following described implementations may be found in the disclosed apparatus and method for automatic control of one or more electrical devices (e.g., lights, an electrical curtain, an aroma dispenser, or a smart furniture), coupled with a media device (e.g., a television, a display device, or a sound system), based on context information associated with media content played-back on the media device. The media device may control the electrical devices via a controller device that may connect the media device with the electrical devices. Exemplary aspects of the disclosure provide a metadata server for generation of metadata associated with media content. The metadata server may communicate the generated metadata to the media device which may control the one or more electrical devices based on the metadata. The metadata server may be configured to determine context information associated with each segment of a plurality of segments of media content based on a characteristic of at least one frame included in each segment of the media content. In case of the media content as an audio-video (AV) content, the determined context information may indicate whether the corresponding segment of the media content is an action scene, a comedy scene, a romantic scene, a suspense scene, a horror scene, a drama scene, a poetry scene, a party scene, or a dance scene. The metadata server may be further configured to use a machine learning model to generate metadata (i.e. associated with each of the segments) based on the determined context information associated with the corresponding segment. The generated metadata may indicate timing information (for example a time interval) at which the one or more electrical devices may be controlled during the play-back of the corresponding segment of the media content on the media device. The metadata server may be configured to transmit the plurality of segments of the media content and the metadata generated for each segment to the media device for play-back of the media content on the media device. The media device may further play-back the media content and simultaneously control the one or more electrical devices based on the generated metadata, via the controller device.

The media device may be configured to control the one or more electrical device, via the controller device, based on the received metadata (i.e. which may be generated based on the context information of the segments by the metadata server) during the playback of the media content. For example, at the time of playback of a romantic scene (as the context of the segment of the media content) by the media device, the received metadata may indicate that the controller device has to control, the electrical devices (such as dim the lights, activate aroma dispenser, or activate an electrical wind chimes) such that an emotional connection between a viewer (or listener) and the rendered media content may be established or enhanced. Thus, the control of the electrical devices based on the real-time context of the segments of the media content may further enhance rendering experience of the media content for the viewer or listener.

FIG. 1 is a block diagram that illustrates an exemplary network environment for control of electrical devices based on context information of media content, in accordance with an embodiment of the disclosure. With reference to FIG. 1, there is shown a network environment 100. The network environment 100 may include a metadata server 102, a media device 106, a first set of electrical devices 108, and a controller device 110. The first set of electrical devices 108 may include a first electrical device 108A, a second electrical device 108B . . . , and an $N^{th}$ electrical device 108N. The metadata server 102 may include a machine learning (ML) model 104. Alternatively, the ML model 104 may be implemented as a separate electronic device or a server. The metadata server 102 may be coupled to the media device 106, via a first communication network 112. As shown in FIG. 1, the media device 106 may be coupled with the controller device 110 that may be further connected with the first set of electrical devices 108, via a second communication network 114.

The metadata server 102 may include suitable logic, circuitry, interfaces, and/or code that may be configured to store the ML model 104. In certain embodiments, the ML model 104 may be separate from the metadata server 102. The metadata server 102 may be configured to receive a first segment from a plurality of segments of first media content. The metadata server 102 may receive the first segment or the plurality of segments from another server (not shown in FIG. 1). Alternatively, the metadata server 102 may receive the first segment from a memory (such as a memory 206 in FIG. 2) of the metadata server 102. The metadata server 102 may be further configured to determine context information associated with the first segment of the first media content based on a characteristic of at least one frame of a plurality of frames in the first segment. In addition, the metadata server 102 may be configured to generate first metadata associated with the first segment. The first metadata may include timing information corresponding to the determined context information to further control the first set of electrical devices 108. The metadata server 102 may be further configured to transmit the first segment of the first media content and the generated first metadata to the media device 106. Examples of the metadata server 102 may include, but are not limited to, an AI-based (artificial intelligence-based) server, an application server, a media server, a cloud server, a mainframe server, a database server, a file server, a web server, or other types of servers.

In one or more embodiments, the ML model 104 may include electronic data, which may be implemented, for example, as a software component, and may rely on code databases, libraries, external scripts, or other logic or instructions for execution of an ML algorithm by a processing device, such as a processor (such as a processor 204 in FIG. 2) or circuitry (such as circuitry 202 in FIG. 2) of the metadata server 102. The ML model 104 may be implemented as code and routines configured to enable a computing device, such as the metadata server 102, to perform one or more operations. The one or more operations may include classification of a characteristic of the plurality of frames in the first segment of the first media content into one of a true description or a false description associated with a parameter of the context information associated with the first segment. Additionally, or alternatively, the ML model 104 may be implemented using hardware including a processor, a microprocessor (e.g., to perform or control performance of the one or more operations), a field-programmable gate array (FPGA), or an application-specific integrated circuit (ASIC). In some other instances, the ML model 104 may be implemented using a combination of hardware and software.

In accordance with an embodiment, the ML model 104 may be a neural network model. Examples of the neural network model may include, but are not limited to, a deep neural network (DNN), a convolutional neural network (CNN), a recurrent neural network (RNN), a CNN-recurrent neural network (CNN-RNN), R-CNN, Fast R-CNN, Faster R-CNN, an artificial neural network (ANN), (You Only Look Once) YOLO network, a Long Short Term Memory (LSTM) network based RNN, CNN+ANN, LSTM+ANN, a gated recurrent unit (GRU)-based RNN, a fully connected neural network, a Connectionist Temporal Classification (CTC) based RNN, a deep Bayesian neural network, a Generative Adversarial Network (GAN), and/or a combination of such networks. In some embodiments, the neural network model may include numerical computation techniques using data flow graphs. In certain embodiments, the neural network model may be based on a hybrid architecture of multiple Deep Neural Networks (DNNs). In accordance with another embodiment, the ML model 104 may include, but is not limited to, a linear regression, a logistic regression, support vector machine (SVM), k-means algorithm, nearest neighborhood algorithm, meta-heuristics model, a decision tree, random forest algorithm, and principal component analysis (PCA) model.

The media device 106 may include suitable logic, circuitry, interfaces, and/or code that may be configured to playback the first media content. The media device 106 may transmit, to the metadata server 102, a first request which includes at least identification information of the first media content. Further, the media device 106 may be configured to receive second media content that may include the requested first media content and the generated plurality of metadata for the plurality of segments in the first media content. In an alternate scenario, the media device 106 may receive the plurality of metadata from the metadata server 102 and may receive the first media content from another server (e.g., a media server, not shown in FIG. 1). The media device 106 may be further configured to control, via the controller device 110, the first set of electrical devices 108 based on the received metadata, in synchronization with the playback of the first media content on the media device 106. In accordance with an embodiment, the controller device 110 may be integrated in the media device 106. Alternatively, the controller device 110 may be implemented as a device separate from the media device 106. Examples of the media device 106 may include, but are not limited to, a television, a mobile phone, a tablet computing device, a personal computer, a gaming console, a media player, a speaker device, a home theatre system, a digital camera, a head-mounted device, an automotive electrical device, an electrical musical instrument, or other electrical device capable of playback of media content and control one or more electrical devices through wired/wireless communication.

Each of the first set of electrical devices 108 may include suitable logic, circuitry, and interfaces that may be configured to perform one or more physical or sensory actions based on a capability of the corresponding electrical device. Each of the first set of electrical devices 108 may perform the action based on a command or a control instruction received from the controller device 110. In case the controller device 110 is integrated with the media device 106, the first set of electrical devices 108 may receive the command or the control instruction from the media device 106. For example, the command or the control instruction may correspond to the timing information in the first metadata corresponding to the first segment that may be played-back on the media device 106. Examples of the one or more physical or sensory actions may include, but are not limited to, a vibration, a sound effect, a lighting effect, a tactile output, a smell/aroma effect, a mechanical/physical action, a taste effect, or an image/video display. Examples of the first set of electrical devices 108 may include, but are not limited to, an aroma dispenser, an electrical furniture (e.g., smart sofa or chair), a lighting device (e.g., smart light), a sound reproduction device, an electrical curtain (e.g., blinds), an electrical toy (a smart toy, or a movie/TV series-specific toy), an electrical wind-chime, an electrical vase (e.g., smart pod or smart vase), a digital photo-frame, or an internet of things (IOT) device. In an embodiment, one or more electrical devices from the first set of electrical devices 108 may be integrated in the controller device 110.

The controller device 110 may include suitable logic, circuitry, interfaces, and/or code that may be configured to control the first set of electrical devices 108 (i.e. coupled to the controller device 110) based on context related metadata associated with media content played back on the media device 106. In an example, the controller device 110 may receive the plurality of metadata corresponding to the first media content from the media device 106. In an embodiment, the controller device 110 may receive subscription information from each of the first set of electrical devices 108. The subscription information of an electrical device from the first set of electrical devices 108 may indicate a subscription of the electrical device to a certain context in the context related metadata. The controller device 110 may control the first set of electrical devices 108 based on the metadata (e.g., the plurality of metadata) and the subscription information associated with each of the first set of electrical devices 108. In an embodiment, the controller device 110 may transmit one or more command instructions to the first set of electrical devices 108 to further control the first set of electrical devices 108. In certain embodiments, the controller device 110 may generate a set of audio fingerprints from the plurality of metadata and may control the first set of electrical devices 108 based on the generated set of audio fingerprints. Examples of the controller device 110 may include, but are not limited to, a smart home device, a smart router, an IoT gateway device, a control device, or an electronic device with communication capability.

The first communication network 112 may include a communication medium through which the metadata server 102 and the media device 106 may communicate with each other. Examples of the first communication network 112 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the first communication network 112, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The second communication network 114 may include a communication medium through which the media device 106, the controller device 110, and the first set of electrical devices 108 may communicate with each other. In some embodiment, the controller device 110 may be an integral part of the second communication network 114. In an embodiment, the second communication network 114 may include a home network or a network established in a physical space where the controller device 110 and the first set of electrical devices 108 may be physically situated. Examples of the second communication network 114 may include, but are not limited to, a home network, a wired network, a Wireless Fidelity (Wi-Fi) network, a Personal Area Network (PAN), a Local Area Network (LAN). Various devices in the network environment 100 may be configured to connect to the second communication network 114, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols. In accordance with an embodiment, the first communication network 112 and the second communication network 114 may be the same network or may include at least one overlapping network portion. Alternatively, the first communication network 112 and the second communication network 114 may be separate communication networks as shown in FIG. 1.

In operation, the metadata server 102 may be configured to receive a first request from the media device 106. The first request may include an identification of the first media content (for example an AV content or audio content). In an embodiment, the media device 106 and the first set of electrical devices 108 may be present in a physical space (such a room). The first media content may be stored in the memory (such as the memory 206 in FIG. 2) of the metadata server 102. Alternatively, the metadata server 102 may receive the first media content from another server (e.g., a media server, not shown in FIG. 1). Further, the metadata server 102 may be configured to receive the first segment of the plurality of segments of the first media content from the memory 206 of the metadata server 102 or from the media server. The metadata server 102 may be further configured to determine the context information associated with the first segment of the first media content based on a characteristic of at least one frame of the plurality of frames included in the first segment. In accordance with an embodiment, the metadata server 102 may apply the stored ML model 104 on the characteristic of at least one frame of the plurality of frames in the first segment to determine the context information associated with the first segment.

In case the first media content corresponds to the audio content, the characteristic of the at least one frame in the first segment may include, but is not limited to, a loudness parameter, a pitch parameter, a tone parameter, a rate-of-speech parameter, a voice quality parameter, a phonetic parameter, an intonation parameter, an intensity of overtones, a voice modulation parameter, a pronunciation parameter, a prosody parameter, a timbre parameter, or one or more psychoacoustic parameters. In such case, the context information of the first segment of the audio content may indicate, but is not limited to, a song, a musical tone, a monologue, a dialogue, a laughter sound, a distress sound, a pleasant sound, an unpleasant sound, an ambient noise, a background sound, a loud sound, or defined sound pattern associated with a real-time object.

Further, in case the first media content corresponds to video content or audio-video (AV) content, the characteristic of the at least one frame in the first segment may include, but is not limited to, an object recognized in the at least one frame, a person recognized in the at least one frame, an emotional state of at least one object in the at least one frame, background information of the at least one frame, an ambient lighting condition in the at least one frame, motion information of at least one object in the at least one frame, a gesture associated with at least one object in the at least one frame, or genre information associated with the at least one frame. In such case, the context information of the first segment of the video content or the AV content may indicate, but is not limited to, an action scene, a comedy scene, a romantic scene, a suspense scene, a horror scene, a drama scene, a poetry scene, a party scene, or a dance scene. The details of the characteristics and the context information for the audio content and/or the AV content is described, for example, in FIGS. 3 and 5.

The metadata server 102 may be further configured to generate the first metadata associated with the first segment based on the determined context information. In an embodiment, the first metadata may include timing information to control the first set of electrical devices 108. The metadata server 102 may be further configured to transmit the first segment of the first media content and the determined first metadata to the media device 106 associated with the first set of electrical devices 108. The first metadata and the control of the first set of electrical devices 108 are described, for example, in FIGS. 3 and 6. In some embodiments, the metadata server 102 may be configured to generate the plurality of metadata for the plurality of segments in the first media content.

In accordance with an embodiment, the metadata server 102 may be configured to transmit, second media content which may include the first media content and the plurality of metadata, to the media device 106. Each metadata in the plurality of metadata may be associated with a corresponding segment of the plurality of segments of the first media content. Each metadata may be generated based on the context information (associated with the corresponding segment) which may be determined based on the characteristic of the at least one frame (that may include audio and/or video content) in the corresponding segment.

Figure 2:
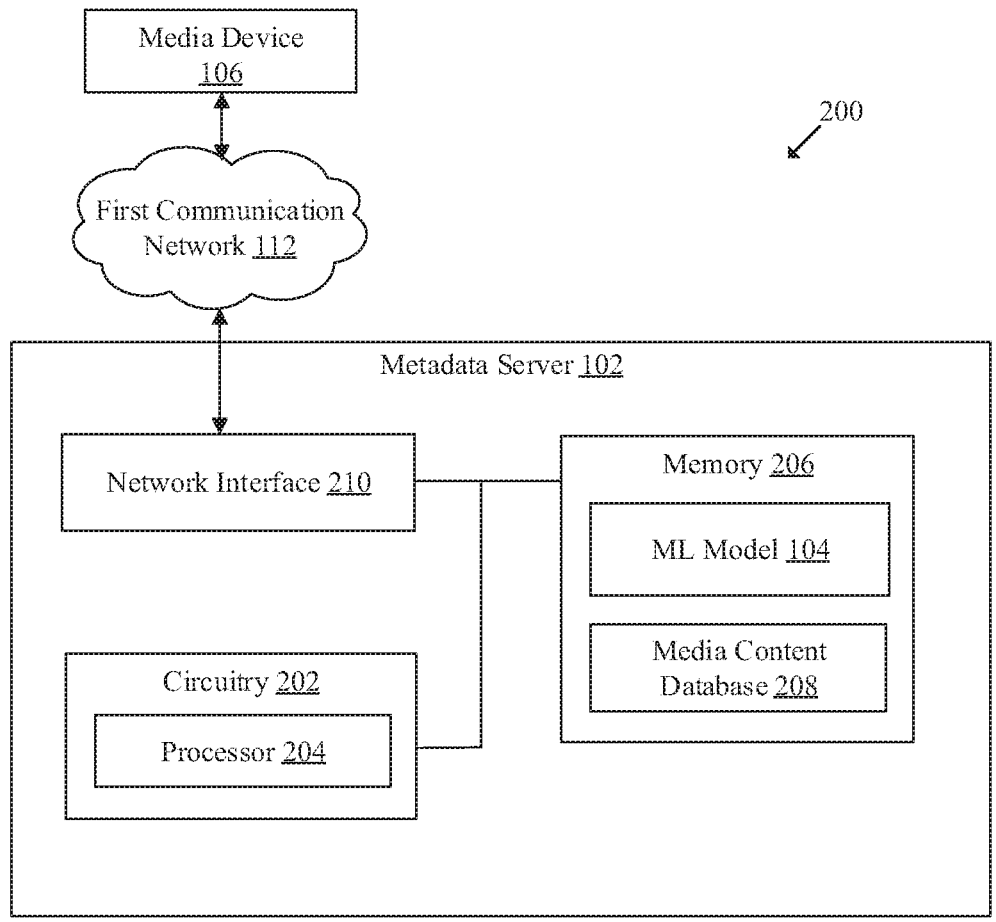
FIG. 2 is a block diagram that illustrates an exemplary metadata server to generate metadata information to control electrical devices based on context information of media content, in accordance with an embodiment of the disclosure.

FIG. 2 is a block diagram that illustrates an exemplary metadata server to generate metadata information to control electrical devices based on context information of media content, in accordance with an embodiment of the disclosure. FIG. 2 is explained in conjunction with elements from FIG. 1. With reference to FIG. 2, there is shown a block diagram 200 of the metadata server 102 that may be coupled to the media device 106, via the first communication network 112. The metadata server 102 may further include circuitry 202 which may include one or more processors, such as a processor 204. The metadata server 102 may further include a memory 206 which may be configured to store the ML model 104, and a media content database 208. The metadata server 102 may further include a network interface 210. The circuitry 202 may be connected with the memory 206 and the network interface 210 through wired or wireless communication of the metadata server 102.

The circuitry 202 may include suitable logic, circuitry, and/or interfaces that may be configured to execute program instructions associated with different operations to be executed by the metadata server 102. For example, some of the operations may include determination of the context information associated with the first segment of the first media content. The circuitry 202 may be further configured to generate the first metadata associated with the first segment and transmit the generated first metadata and the first segment to the media device 106. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The processor 204 may include suitable logic, circuitry, and/or interfaces that may be configured to execute a set of instructions stored in the memory 206. The processor 204 may be configured to execute program instructions associated with different operations to be executed by the metadata server 102. For example, some of the operations may include the determination of the context information, the generation of the first metadata, and the transmission of the first metadata and the first segment. The processor 204 may be implemented based on a number of processor technologies known in the art. Examples of the processor technologies may include, but are not limited to, a Central Processing Unit (CPU), X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), and other processors.

The memory 206 may comprise suitable logic, circuitry, interfaces, and/or code that may be configured to store the ML model 104. The memory 206 may be further configured to store the media content database 208. The media content database 208 may store the first media content. In some embodiments, the memory 206 may be configured to store the generated first metadata or the plurality of metadata. Examples of implementation of the memory 206 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 210 may comprise suitable logic, circuitry, interfaces, and/or code that may be configured to facilitate communication between the metadata server 102 and the media device 106, via the first communication network 112. The network interface 210 may be implemented by use of various known technologies to support wired or wireless communication of the metadata server 102 with the first communication network 112. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

Figure 3:
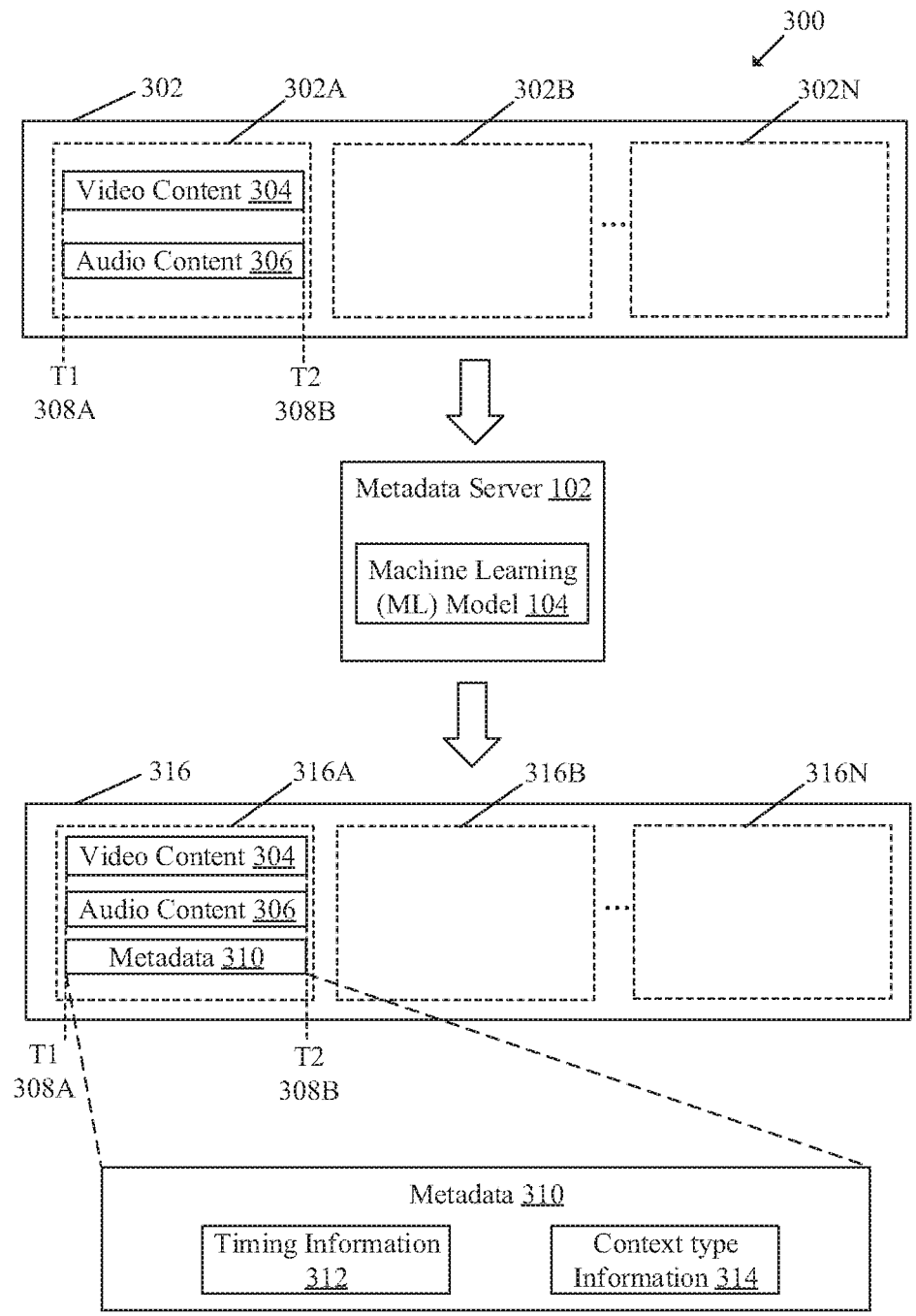
FIG. 3 is a diagram that illustrates an exemplary scenario for generation of metadata by a metadata server of FIG. 2 to control electrical devices based on context information of media content, in accordance with an embodiment of the disclosure.

FIG. 3 is a diagram that illustrates an exemplary scenario for generation of metadata by a metadata server of FIG. 2, to control electrical devices based on context information of media content, in accordance with an embodiment of the disclosure. FIG. 3 is described in conjunction with elements from FIG. 1 and FIG. 2. With reference to FIG. 3, there is shown an exemplary scenario 300 that may include first media content 302. The first media content 302 may include a plurality of segments, such as a first segment 302A, a second segment 302B . . . and an Nth segment 302N. Each segment of the plurality of segments (such as, the first segment 302A shown in FIG. 3) may include video content 304 and audio content 306 associated with the corresponding segment. In case of the audio content as the first media content 302, each segment may include only the audio content 306. Further in FIG. 3, there is also shown, a first time instance 308A (referred as "T1") and a second time instance 308B (referred as "T2") which may be associated with a start time and an end time of the first segment 302A within the first media content 302.

In FIG. 3, there is further shown the metadata server 102 that may include the ML model 104. The ML model 104 may be stored in the memory 206 of the metadata server 102. There is also shown second media content 316 that may be generated from the first media content 302 by the metadata server 102 using the ML model 104. The second media content 316 may include a plurality of metadata-embedded (ME) segments, such as, a first ME segment 316A (corresponding to the first segment 302A), a second ME segment 316B (corresponding to the second segment 302B) . . . and an Nth ME segment 316N (corresponding to the Nth segment 302N). Each of the plurality of ME segments (such as the first ME segment 316A) may include metadata 310 (hereinafter, referred as first metadata 310 for the first segment 302A), as shown in FIG. 3. The timing or length of the first metadata 310 may correspond to the time interval between the first time instance 308A and the second time instance 308B. In some embodiments, the timing of the first metadata 310 may correspond to a portion of the time interval between the first time instance 308A and the second time instance 308B. Further, as shown in FIG. 3, the first metadata 310 (e.g., the first metadata associated with the first segment 302A) may include timing information 312 and context type information 314.

With reference to FIG. 3, the circuitry 202 of the metadata server 102 may be configured to retrieve the first media content 302 from the memory 206. In some embodiments, the circuitry 202 may receive the first media content 302 from a computing device (such as, the media device 106, or another server not shown in FIG. 1). Further, the circuitry 202 may store the received first media content 302 in the memory 206 for further creation of the metadata (such as the first metadata 310).

In some embodiments, the circuitry 202 may be configured to retrieve the first media content 302, based on to the receipt of the first request from the media device 106. The first request may include the identification information that may uniquely identify the first media content 302 and/or indicate a storage location (e.g. a memory location or a Uniform Resource Locator (URL)) of the first media content 302 in the memory 206. The first request received from the media device 106 may be a request to generate the plurality of metadata to further control the first set of electrical devices 108 based on the generated plurality of metadata. In some embodiments, the metadata server 102 may generate and store the plurality of metadata for the first media content 302 without a receipt of the first request from the media device 106. In some embodiments, based on the receipt of the first request from the media device 106, the circuitry 202 may retrieve the pre-generated metadata and transmit the retrieved and pre-generated metadata to the media device 106 to control the first set of electrical devices 108 along with the playback of the first media content 302.

In certain embodiments, the circuitry 202 of the metadata server 102 may be configured to transmit, to a media server, the request which includes identification information of the first media content 302. Based on the transmitted request, the circuitry 202 may receive the first media content 302 including the first segment 302A or the plurality of segments from the media server. The circuitry 202 may store the received first media content 302 in the memory 206 and generate the first metadata 310 associated with the first segment 302A. The circuitry 202 may then transmit the received first segment 302A of the first media content 302 and the generated first metadata 310 to the media device 106.

In accordance with an embodiment, the circuitry 202 may be further configured to retrieve the first segment 302A from the plurality of segments (e.g., the first segment 302A to the Nth segment 302N) of the first media content 302. In an embodiment, each of the plurality of segments, such as, 302A to 302N, may correspond to a portion of the first media content 302. Each segment may be of a pre-defined time duration that may be defined at a time of capture or creation of the first media content 302. In an embodiment, the time duration may vary from a few seconds to minutes. Each of the plurality of segments, 302A to 302N, may include a pre-defined number of frames. A frame may correspond to a smallest unit of capture of a video or audio. For instance, in case of a video, a frame may include a single image captured at a particular time. Further, in case of audio, a frame may include a set of audio samples captured at a particular time. The number of frames in a segment may depend on a capture rate (i.e. frame rate) of the video or audio in the segment. For instance, in case, the first segment 302A includes the video content 304, the time duration of the first segment 302A may correspond to the time interval between the first time instance 308A and the second time instance 308B. The video content 304 of the first segment 302A may include pre-defined number of video frames (say, 300 frames, in the 10 seconds segment captured at the rate of 30 frames per second).

In accordance with an embodiment, the circuitry 202 may be further configured to determine the context information associated with the first segment 302A. The context information may be determined based on a characteristic of at least one frame of the plurality of frames included in the first segment 302A. In some embodiments, the context information may be determined based on a set of frames of the plurality of frames included in the first segment 302A. In accordance with an embodiment, the circuitry 202 may apply the ML model 104 on the characteristic of each of the plurality of frames in the first segment 302A to determine the context information associated with the first segment 302A.

For the application of the ML model 104, the circuitry 202 may be configured to extract each of the plurality of frames of the video content 304 and the audio content 306 in the first segment 302A (between the first time instance 308A and the second time instance 308B). In some embodiments, each of the plurality of frames may include image content (as the video content 304) and the audio content 306 (stored in synchronization with the image content) such that both the video content 304 and the audio content 306 may be played back concurrently. For example, the combination of the video content 304 and the audio content 306 in the first segment 302A may include, but is not limited to, a video clip, a movie scene, or a video shot. The circuitry 202 may further determine the characteristic of at least one frame of the plurality of image/video frames (of the video content 304) and of at least one frame of the plurality of audio frames (of the audio content 306), based on one or more image processing and audio processing techniques, respectively.

In case of the video content 304, the characteristic of the at least one frame (i.e. image frame) in the first segment 302A (or other segments) may include, but is not limited to, an object recognized in the at least one frame, a person recognized in the at least one frame, an emotional state of at least one object in the at least one frame, background information of the at least one frame, an ambient lighting condition in the at least one frame, motion information of at least one object in the at least one frame, a gesture associated with at least one object in the at least one frame, or genre information associated with the at least one frame. In accordance with an embodiment, the stored ML model 104 may be pre-trained based on different types of characteristics of the video content 304 to determine the context information of the first segment 302A. The context information of the video content 304 (or image content) of the first segment 302A may indicate a type of scene or shot referred by the first segment 302A. Examples of the context information may include, but is not limited to, an action scene, a comedy scene, a romantic scene, a suspense scene, a horror scene, a drama scene, a poetry scene, a party scene, or a dance scene.

In case of the audio content 306 in the first media content 302, the characteristic of the at least one frame (i.e. audio frame) in the first segment 302A may include, but is not limited to, a loudness parameter, a pitch parameter, a tone parameter, a rate-of-speech parameter, a voice quality parameter, a phonetic parameter, an intonation parameter, an intensity of overtones, a voice modulation parameter, a pronunciation parameter, a prosody parameter, a timbre parameter, or one or more psychoacoustic parameters. In accordance with an embodiment, the stored ML model 104 may be pre-trained based on different types of characteristics of the audio content 306 to further determine the context information of the first segment 302A. Examples of the context information of the audio content 306 in the first segment 302A may include, but is not limited to, a song, a musical tone, a monologue, a dialogue, a laughter sound, a distress sound, a pleasant sound, an unpleasant sound, an ambient noise, a background sound, a loud sound, or defined sound pattern associated with a real-time object. In accordance with an embodiment, the circuitry 202 may be configured to determine the context information of the first segment 302A based on the application of the pre-trained (or stored) ML model 104 on the determined characteristics of the video content 304 (image content) and the determined characteristics of the audio content 306 in the first segment 302A.

For example, in case, the circuitry 202 detects an object included in the at least one frame of the first segment 302 as a human being, and further recognizes the human being as a celebrity (i.e. characteristic), the circuitry 202 may determine the context (as a comedy scene) of the first segment 302A based on profile information (i.e. comedy artist) of the recognized celebrity. The circuitry 202 may detect the objects as human being from the plurality of frames of the first segment 302A based on the image processing techniques or object detection techniques known in the art. The detailed implementation of the aforementioned technique may be known to one skilled in the art, and therefore, a detailed description for the aforementioned technique has been omitted from the disclosure for the sake of brevity In another example, the circuitry 202 may determine one or more facial/emotional expressions (i.e. characteristics) of people detected in the plurality of frames of the first segment 302A and may further determine the context of the video content 304 of the first segment 302A. For instance, in case of happy, smiling or laughter emotions, the circuitry 202 may determine the context of the video content 304 as, for example, a comedy scene or a romantic scene.

In another example, the circuitry 202 may determine an ambient lighting condition in the plurality of frames in the first segment 302A based on the image processing techniques known in the art to identify background brightness or the ambient lighting condition in the frames. In case, the circuitry 202 detects dim or low lighting conditions (i.e. characteristics) with frightened face expressions or emotions (i.e. characteristics) of the detected people in the frames, the circuitry 202 may determine the context of the video content 304 of the first segment 302A as (for example) a suspense/thriller scene or a horror scene.

In some embodiments, the circuitry 202 may identify gestures (i.e. characteristics) of at least one object (such as people) detected in the plurality of frames of the first segment 302A to determine the context of the video content 304. For example, if a particular pattern of hand movement, body movement, or feet movement of one or more persons is detected within multiple frames of the video content 304, the circuitry 202 may determine the context of the video content 304 as, for example, a dance scene.

In certain embodiments, the circuitry 202 may recognize a human being in the plurality of frames of the first segment 302A as a celebrity (i.e. characteristics) The circuitry 202 may further analyze the profile information of the recognized celebrity to identify a genre (i.e., characteristics) associated with the celebrity as the genre associated with the plurality of frames of the first segment 302A. For example, in case the celebrity is a drama artist, the circuitry 202 may determine the genre of the first segment 302A as a drama genre. Examples of the genre may include, but is not limited to, at least one of an action genre, an adventure genre, an animation/anime genre, a biopic genre, a children genre, a comedy genre, a crime/detective/spy genre, a documentary genre, a drama genre, a horror genre, a family genre, a fantasy genre, a historical genre, a matured content genre, a medical genre, a musical genre, a paranormal genre, a romance genre, a sport genre, a science-fiction genre, a talk show genre, a suspense/thriller genre, a war genre, or a western genre. The circuitry 202 may further determine the context information of the first segment 302A based on the determined genre of the people detects in the plurality of frames in the first segment 302A. In another example, the circuitry 202 may recognize one or more objects in the plurality of frames of the video content 304 as animated objects. In such case, the circuitry 202 may determine the context information of the first segment 302A as an animated scene or a kid's movie scene.

In some embodiments, the circuitry 202 may configured to determine the context of the first segment 302A based on the combination of multiple characteristics determined from the plurality of frames in the first segment 302A. For example, in case, the circuitry 202 detects multiple people in the plurality of frames of sports genre (for example related to cricket) as a first characteristic, and detects background information in the plurality of frames as a playground (i.e. a second characteristic), then the circuitry 202 may detect the context of the first segment 302A as a cricket match scene (i.e. sport scene) based on the determined first characteristic and the second characteristic. In another example, in case, the circuitry 202 detects a vehicular object (as the first characteristics) in at least one frame and detects motion information (i.e. second characteristic) of the detected vehicle object in the plurality of plurality of frames of the first segment 302A, then the circuitry 202 may detect the context of the first segment 302A as vehicle movement, based on the determined first characteristic and the second characteristic.

In accordance with an embodiment, the circuitry may further determine the characteristics of the audio content 306 of the first segment 302A to determine the context of the first segment 302A of the first media content 302. For example, in case, the circuitry 202 detects a high pitch sound as the loudness/pitch parameter (i.e. characteristics), the circuitry 202 or the ML model 104 may determine the context of the audio content 306 of the first segment 302A as a loud sound or a distress sound. In another example, in case, the circuitry 202 detects audio beats (i.e. characteristics) at certain frequencies in the audio content 306 in the frames of the first segment 302A, the circuitry 202 may determine the context of the audio content 306 as a musical tone, a song, a pleasant sound, or a background score. In another example, based on rate-of-speech, types of pronunciations, and voice modulation (i.e. characteristics) detected from the frames in the audio content 306 of the first segment 302A, the circuitry 202 may determine the context of the audio content 306 as a monologue or a dialogue. In an embodiment, the circuitry 202 may apply the ML model 104 to detect if the frames of the audio content 306 may correspond to defined sound patterns (i.e. characteristics) associated with real-time objects, such as, but not limited to, automobile engine sounds, airplane sounds, or animal sounds. The circuitry 202 may identify the real-time objects based on the sound patterns and further determine the context information, for example, such as a presence of sound of the airplane in the audio frame. Furthermore, the circuitry 202 may detect the laughter sound (for example) based on analysis of the plurality of frames in the audio content 306 of the first segment 302A using the ML model 104. Thus, the ML model 104 may be pre-trained based on different image or audio characteristics to determine the context of the first segment 302A. The circuitry 202 may be configured to determine the image or audio characteristics from the plurality of frames in the first segment 302A and may apply the stored or pre-trained ML model 104 on the determined image or audio characteristics to determine the context information of the first segment 302A.

In one or more embodiments, the circuitry 202 may determine the context information of the first segment 302A based on a combination of the context information determined for the video content 304 and the context information for the audio content 306. For example, if the context information of the video content 304 is determined as an action context and the context information of the audio content 306 is determined as a distress sound, the context information of the first segment 302A may be determined as an action context or a fight sequence context. In case, the circuitry 202 determines that the audio content 306 corresponds to a loud sound (i.e., context information of the audio content 306) and the video content 304 corresponds to hand and arm gestures (i.e., characteristics associated with context information of the video content 304), the circuitry 202 may determine the context information of the first segment 302A as a party or a dance context.

In another example, the circuitry 202 may recognize two or more human beings in the plurality of frames of the video content 304 of the first segment 302A as celebrities, such as, actors (i.e. characteristics). The circuitry 202 may further categorize the two or more recognized human beings as actors in positive and negative roles respectively, based on the stored profile information of the two or more recognized human beings. Further, in case, the circuitry 202 detects hand gestures (i.e., characteristics) of the two or more recognized human beings from the plurality of frames and detects loud human sound (i.e. characteristics) from the audio content 306, the circuitry 202 may determine the context information of the first segment 302A as, for example, an action context.

In another example, the circuitry 202 may recognize a human being in the plurality of frames of the video content 304 of the first segment 302A as a sports person (i.e., characteristics) and may determine that the audio content 306 corresponds to a loud sound (i.e., context information of the audio content 306). For example, in case, the loud sound may correspond to cheering a crowd, then the circuitry 202 may determine the context information of the first segment 302A as a sports context.

In an embodiment of the media device 106, the media device 106 may be configured store or receive subscription information associated with each of the first set of electrical devices 108. The subscription information may indicate a subscription of each of the first set of electrical devices 108 with one or more contexts (for example the determined context information of the first media content 302). The media device 106 may control the first set of electrical devices 108, via the controller device 110, based on each metadata (i.e. the first metadata 310 that may include the determined context information) and the subscription information associated with each of the first set of electrical devices 108. The control of the first set of electrical devices 108 based on the first metadata 310 and the subscription information is described, for example, in FIG. 5.

For example, in case, the context information of the first segment 302A corresponds to a romantic scene, and a smart light 508 and blinds 512 have subscribed for romantic scene context with the controller device 110 or with the media device 106, then the media device 106 may control the smart light 508 and the blinds 512, via the controller device 110. In certain scenarios, the smart light 508 may operate in a dim light mode and the blinds 512 may operate in a closed state in case the context information of the first segment 302A is a romantic scene. In an example, the media device 106 may enable, via the controller device 110, an aroma dispenser 526 to dispense a pre-determined smell (such as, a fragrance of a rose) for a duration of the first segment 302A associated with the romantic scene, in case the aroma dispenser 526 has pre-subscribed with the controller device 110 or with the media device 106 for a romantic scene context.

Figure 5:
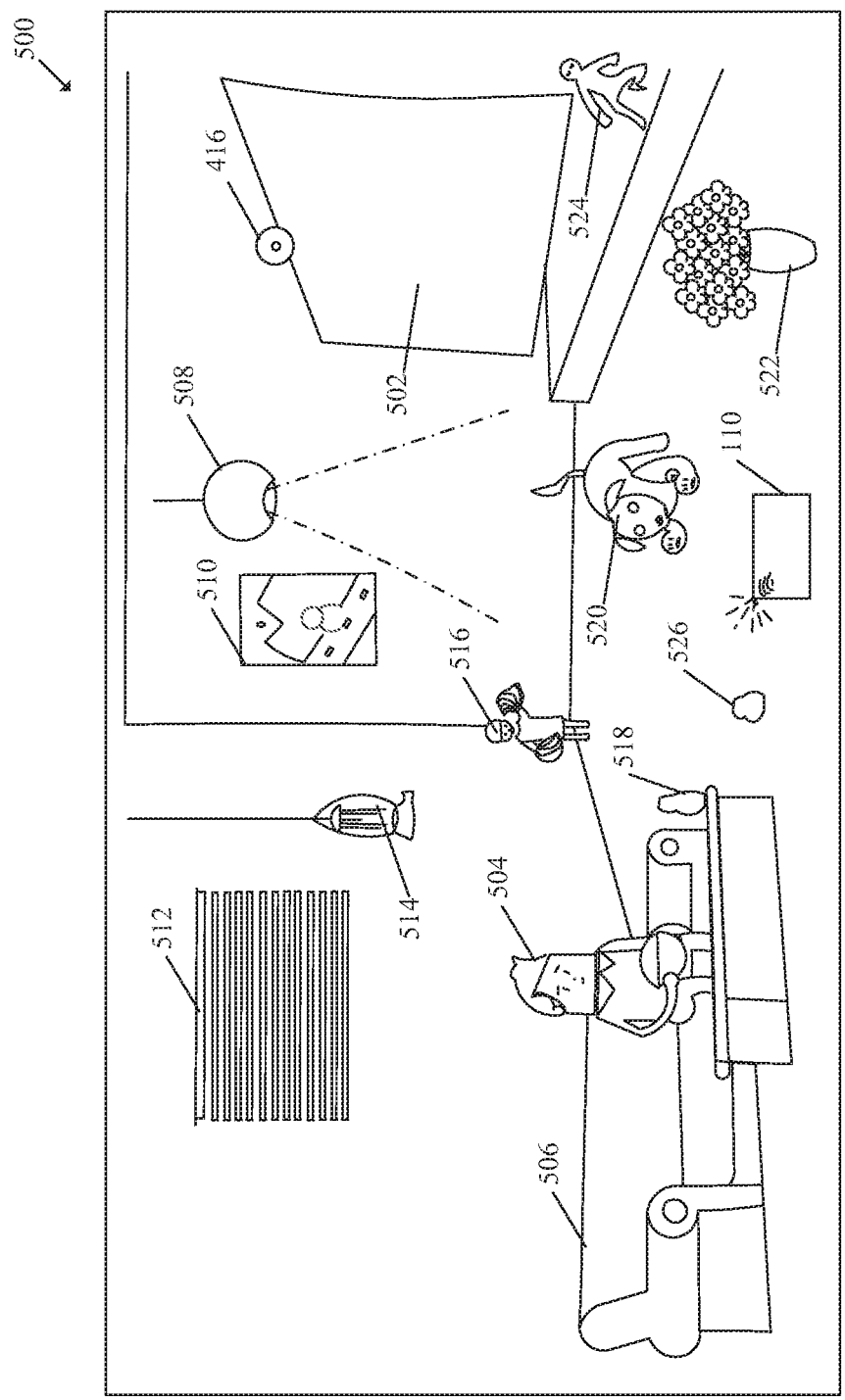
FIG. 5 is a diagram that illustrates an exemplary scenario for control of electrical devices based on context information of media content by the media device, via a controller device, in accordance with an embodiment of the disclosure.

In another example, in case, the context information associated with the first segment 302A corresponds to a motion of a vehicle that includes one or more individuals and a smart-sofa 506 (i.e. one of the first set of electrical devices 108) has pre-subscribed with the controller device 110 (or with the media device 106) for such context of moving objects, then the media device 106 may control, via the controller device 110, the smart-sofa 506 to vibrate/shake to provide a real-time vehicular motion experience to a user 504 (as shown in FIG. 5), to whom the first segment 302A may be rendered. For example, the media device 106 or the controller device 110 may transmit a command to the smart-sofa 506 associated with the context of the moving object. Based on the received command, the smart-sofa 506 may vibrate or shake in a predefined pattern.

In yet another example, in case, the circuitry 202 of the metadata server 102 recognizes a celebrity as an action hero/super-hero (i.e. characteristics) from the first segment 302A and the context information as an action scene, and further a smart celebrity toy 524 (one of the first set of electrical devices 108) has pre-subscribed with the controller device 110 or the media device 106 for such an action scene context, then the media device 106 may set the smart celebrity toy 524, via the controller device 110, to an active or ON mode to demonstrate the action scene. The smart celebrity toy 524 may be configured to perform one or more pre-defined actions, such as, jump, kick, bend, walk, and the like, in the active/ON mode. In certain scenarios, the smart celebrity toy 524 may be configured to mimic one or more sound patterns associated with the video content 304 of the first segment 302A.

At the time of playback of the first media content 302, the control of the first set of electrical devices 108 may synchronize actions (physically, visually, or audibly) between the rendered first media content 302 and the controlled first set of electrical devices 108. This may further enhance content experience of a viewer or listener (for example, the user 504 in FIG. 5) for the first media content 302 as the controlled first set of electrical devices 108 may express or resonate the mood or emotions of the different portions of the rendered first media content 302. Therefore, the viewer or listener may emotionally connect with the rendered first media content 302 and/or may feel as a part of the rendered first media content 302.

In accordance with an embodiment, the first metadata 310 (i.e. generated by the circuitry 202 of the metadata server 102 for the first segment 302A) may be included in the second media content 316, as shown in FIG. 3. The generated first metadata 310 may be included in the first ME segment 316A of the second media content 316. In some embodiments, the generated first metadata 310 may be time-synchronized with the first segment 302A such that the timings of the first metadata 310 may be associated with the timing between the first time instance 308A and the second time instance 308B (as shown in FIG. 3). Further, as shown in FIG. 3, the first metadata 310 for the first segment 302A may include timing information (for example, the timing information 312) based on which the selected first set of electrical devices 108 may be controlled by the media device 106 (either directly or via the controller device 110).

In accordance with an embodiment, the timing information 312 in the first metadata 310 may indicate exact time at which one or more of selected first set of electrical devices 108 may be controlled during the playback of the first segment 302A by the media device 106. In some embodiments, the timing information 312 may indicate the time interval between which the first set of electrical devices 108 may be controlled. For example, the time interval indicated by the timing information 312 may be same as a time interval between the first time instance 308A and the second time instance 308B of the first segment 302A of the first media content 302. In some embodiments, the timing information 312 may be the time interval which may be a portion (for example in certain percentage) of the time interval between the first time instance 308A and the second time instance 308B. In some embodiments, the time interval indicated by the timing information 312 may include multiple time intervals (within the first segment 302A) which may vary based on the determined context information.

For example, in case multiple contexts been determined within the first segment 302A (say with total time period of 20 seconds), such as a romantic context between T1 and $10^{th}$ second and a comedy context between $11^{th}$ second to T2, the circuitry 202 may determine multiple metadata (for example, first sub-metadata and second sub-metadata) included in the first metadata 310 for the first segment 302A. Examples of multiple metadata with multiple time intervals for the first segment 302A is presented in Table 1:

TABLE 1

Exemplary values of information in first metadata 310

| Metadata | Timing Information | Context Type |
|---|---|---|
| First Sub metadata of the first metadata 310 | T1-$10^{th}$ second | Romantic context |
| Second Sub metadata of the first metadata 310 | $11^{th}$ second-T2 | Comedy context |

For example, as shown in the Table 1, for the duration between T1 to $10^{th}$ second, the first sub metadata of the first metadata 310 may indicate a romantic context. Further, for the duration between $11^{th}$ second to T2, the second sub metadata of the first metadata 310 may indicate a comedy context. In a certain scenario, in case, the smart light 508 is subscribed for the romantic context, while the blinds 512 are subscribed for the comedy context, then the media device 106 (either directly or via the controller device 110) may control the smart light 508 between T1 to $10^{th}$ second of the playback of the first segment 302A and control the blinds 512 between the $11^{th}$ second to T2 of the playback of the first segment 302A. For example, between the T1 to $10^{th}$ second, the smart light 508 may be enabled to produce a dim light to enhance the subscribed romantic context, and between the $11^{th}$ second to T2 of the playback of the first segment 302A, the blinds 512 may be enabled to operate in an "open" state to enhance the subscribed comedy context. Thus, an emotional timeline related to the first segment 302A of the first media content 302 may be provided by the controlled first set of electrical devices 108 (for example, the smart light 508 and the blinds 512). This further provides an enhanced user experience based on the creation of the emotional context (i.e. associated with the played-back first segment 302A) by the controlled first set of electrical devices 108.

In one or more embodiments, the circuitry 202 may be further configured to identify a type of the first segment 302A or the first media content 302. The type of the first segment 302A may be identified based on an indicator embedded in the first media content 302. Examples of the type of the first segment 302A may include, but are not limited to, an audio type segment (which may only include the audio content 306), a video type segment (which may only include the video content 304 or image content), an audio-video (AV) type segment (which may include both the audio content 306 and the video content 304), or a gaming type segment (which may include the audio content 306 and the video content 304 with animated objects). In accordance with an embodiment, the circuitry 202 may generate the first metadata 310 associated with the first segment 302A based on the identified type. In an embodiment, the type of the first segment 302A may correspond to a genre of content represented by the first segment 302A of the first media content 302.

For example, in case the identified type of the first segment 302A is an audio type, then electrical devices, such as, smart lights, blinds, and digital photo-frame may be controlled based on the subscription of such electrical devices to the context information (for example pleasant sound) associated with the first metadata 310. In such example, the smart lights may operate in a "bright light" mode, the blinds may operate in an "open state" and the digital photo-frame may display pictures that may be likable by the user 504 based on predefined capability of the electrical devices subscribed to particular contexts.

In another example, in case the identified type of the first segment 302A is an AV type, electrical devices such as, a smart-sofa 506, smart lights 508, blinds 512, or an aroma dispenser 526 may be controlled based on the subscription of such electrical devices to the context information (for example vehicle racing scene) associated with the first metadata 310. In such example, the smart-sofa 506 may vibrate in a certain pattern, the smart lights 508 may operate in a pulsating light mode, the blinds 512 may operate in a closed mode, and the aroma dispenser 526 may dispense a smell of motor oil or tire rubber.

In another example, consider that the circuitry 202 identifies that the type of the first segment 302A is a gaming video or an animated video type, the electrical device, such as a robotic toy 520 (or a super-hero toy) may be controlled based on the subscription of such electrical device to the context information associated with the first segment 302A. In such case, the robotic toy 520 (or the super-hero toy) may be controlled according to a character present in the gaming or animated video (for example, the robotic toy 520 may mimic the character or perform one or more pre-defined actions, such as jump, bend, or walk, on occurrence of a particular event in the game or the animate video).

In accordance with an embodiment, based on the generation of the first metadata 310, the circuitry 202 may be configured to transmit the first metadata 310 and the first segment 302A to the media device 106 coupled with the first set of electrical devices 108. The media device 106 may control the first set of electrical devices 108, via the controller device 110, based on each received metadata (e.g., the first metadata 310) and the subscription information associated with each of the first set of electrical devices 108. The first metadata 310 may include the timing information 312 and the context type information 314 that may be used to control the first set of electrical devices 108, while the first segment 302A may be played-back on the media device 106 as described, for example, in FIG. 5.

In one or more embodiments, the circuitry 202 may be configured to retrieve the plurality of segments (which may include segments from, the first segment 302A to the Nth segment 302N) from the first media content 302 stored in the memory 206. The circuitry 202 may be further configured to generate a plurality of metadata, each of which corresponds to a segment, from the plurality of segments. Each metadata of the plurality of metadata may be generated based on the determination of the context information of the corresponding segment. The generation of each of the plurality of metadata may be performed in a manner similar to the generation of the first metadata 310 associated with the first segment 302A as described above with respect to FIG. 3.

In accordance with an embodiment, the circuitry 202 may be further configured to generate the second media content 316 from the first media content 302 based on the generated plurality of metadata. For example, the circuitry 202 may embed or include the generated plurality of metadata within the first media content 302 to generate the second media content 316. The second media content 316 may include the plurality of ME segments (e.g., the first ME segment 316A to the Nth ME segment 316N), which may include corresponding embedded metadata. For instance, the first ME segment 316A may include the first metadata 310 as shown in FIG. 3. Further, the circuitry 202 of the metadata server 102 may be configured to transmit the second media content 316 to the media device 106, for control of the first set of electrical devices 108 based on the generated plurality of metadata, at the time of playback of the first media content 302 (i.e. included in the second media content 316). In some embodiments, based on the receipt of the first request from the media device 106, the metadata server 102 may transmit the first media content 302 and the generated plurality of metadata separately, rather than including both in the second media content 316. In some embodiments, the first request received from the media device 106 may only indicate a request to generate the plurality of metadata for the first media content 302. In such case, the first media content 302 may be prestored in the media device 106 and the metadata server 102 may transmit only the generated plurality of metadata based on the received first request.

In an exemplary scenario, the media device 106 may receive the first media content 302 along with the plurality of metadata as the second media content 316 from a single server, such as, the metadata server 102. In another scenario, the media device 106 may receive the first media content 302 from a media server (not shown in FIG. 1) and may receive the plurality of metadata for the first media content 302 from another metadata server (such as, the metadata server 102). In yet another scenario, the media device 106 may store the first media content 302 on a memory location of a computing device (such as another media server or media rendering device). The media device 106 may transmit the memory location within the first request to the metadata server 102. The circuitry 202 of the metadata server 102 may be configured to retrieve the first media content 302 from the memory location, generate the plurality of metadata and transmit the second media content 316 to the media device 106.

Figure 4:
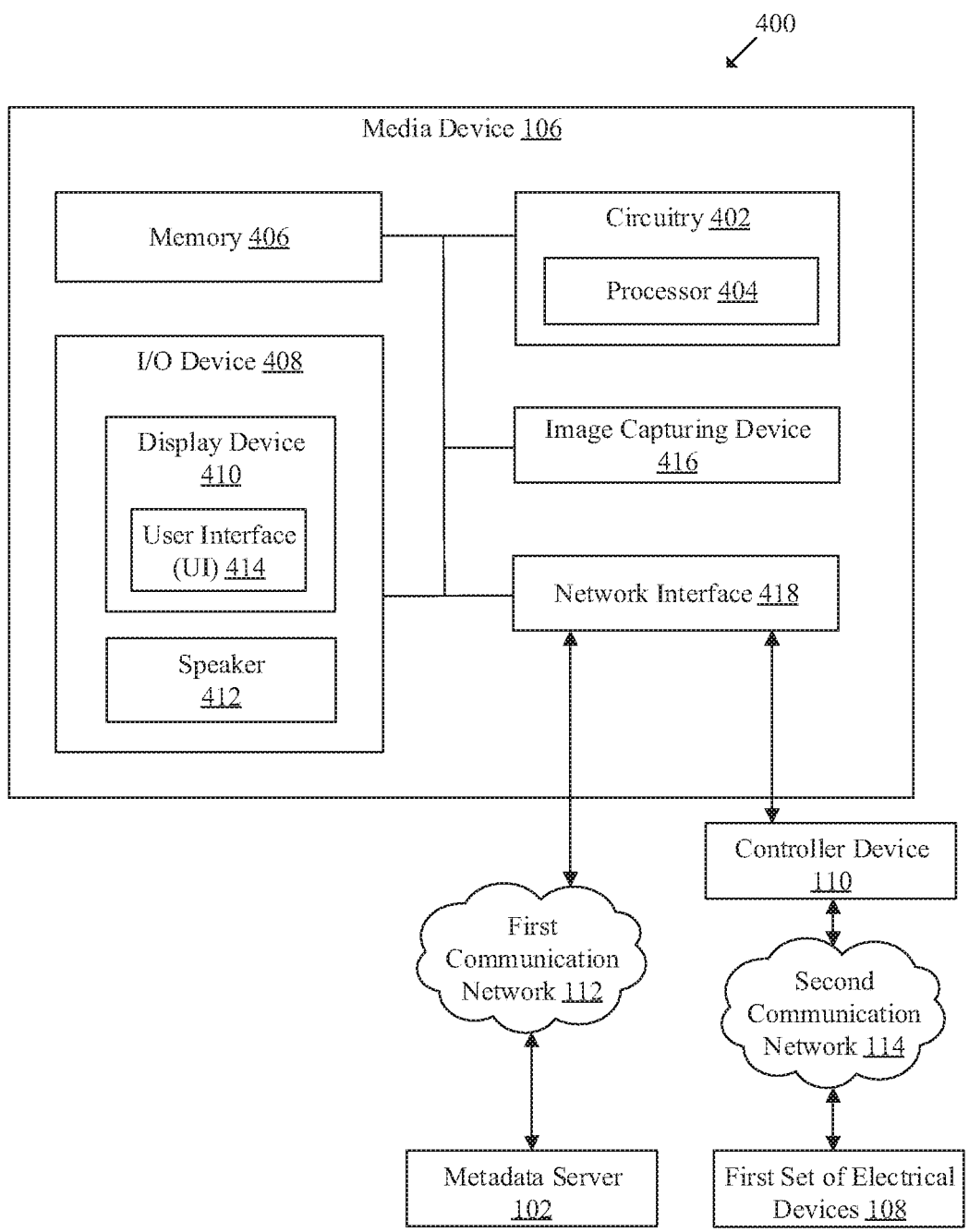
FIG. 4 is a block diagram that illustrates an exemplary media device to control electrical devices based on context information of media content, in accordance with an embodiment of the disclosure.

FIG. 4 is a block diagram that illustrates an exemplary media device to control electrical devices based on context information of media content, in accordance with an embodiment of the disclosure. FIG. 4 is explained in conjunction with elements from FIGS. 1, 2, and 3. With reference to FIG. 4, there is shown a block diagram 400 of a media device (for example the media device 106). The media device 106 may include circuitry 402, which may include one or more processors, such as a processor 404. The media device 106 may further include a memory 406 and an I/O device 408 that may further include a display device 410, a speaker 412, and a user-interface (UI) 414. The media device 106 may further include an image capturing device 416 and a network interface 418 through which the media device 106 may be connected to the metadata server 102 and the first set of electrical devices 108, via first communication network 112 and the second communication network 114, respectively. The media device 106 may be further coupled with the controller device 110 to control the first set of electrical devices 108, via the controller device 110 and second communication network 114. In another embodiment, the controller device 110 may be integrated within the media device 106 (not shown in FIG. 4), such that the media device 106 may directly control the first set of electrical devices 108, via the second communication network 114.

The circuitry 402 may comprise suitable logic, circuitry, interfaces and/or code that may be configured to playback media content (for example the first media content 302). The circuitry 402 may communicate with the metadata server 102 to transmit the first request including at least the identification information of the first media content, via the first communication network 112. Further, the circuitry 402 may be configured to receive the second media content 316 that may include the first media content 302 and the plurality of metadata as described, for example, in FIG. 3. The circuitry 402 may be configured to control the first set of electrical devices 108, via the controller device 110, in synchronization with the playback of the second media content 316 on the I/O device 408 based on the timing information 312 and context type information 314 indicated in each metadata of the plurality of metadata. The circuitry 402 may be configured to transmit a trigger command or control instructions to the first set of electrical devices 108 (based on the subscription information) to control the first set of electrical devices 108, via the controller device 110 and the second communication network 114.

The processor 404 may comprise suitable logic, circuitry, and interfaces that may be configured to execute instructions stored in the memory 406. In certain scenarios, the processor 404 may be configured to execute the aforementioned operations of the circuitry 402. The processor 404 may be implemented based on a number of processor technologies known in the art. Examples of the processor 404 may be a Central Processing Unit (CPU), X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), other processors, or a combination thereof.

The memory 406 may comprise suitable logic, circuitry, interfaces, and/or code that may be configured to store the first media content 302 or the second media content 316 to be played-back on the I/O device 408. The memory 406 may be further configured to store the first metadata or the plurality of metadata. In some embodiments, the memory 406 may store the subscription information of each of the first set of electrical devices 108 which may indicate the subscription of the electrical device with one or more contexts of the media content. The first set of electrical devices 108 may subscribe with different contexts (for example, but not limited to, romantic, action, comedy, or action) based on their operational capability. Examples of implementation of the memory 406 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 408 may comprise suitable logic, circuitry, interfaces, and/or code that may be configured to receive an input and provide an output based on the received input. The I/O device 408 may include various input and output devices, which may be configured to communicate with the circuitry 402. Examples of the I/O device 408 may include, but are not limited to, a touch screen, a keyboard, a mouse, a joystick, a display device (for example, the display device 410), a microphone, and a speaker (for example, the speaker 412).

The display device 410 may comprise suitable logic, circuitry, and interfaces that may be configured to display an output of the media device 106. The display device 410 may be utilized to render the UI 414. In some embodiments, the display device 410 may be an external display device associated with the media device 106. The display device 410 may be a touch screen which may enable a user to provide a user-input via the display device 410. The touch screen may be at least one of a resistive touch screen, a capacitive touch screen, or a thermal touch screen. The display device 410 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 410 may refer to a display screen of a head mounted device (HMD), a smart-glass device, a see-through display, a projection-based display, an electro-chromic display, or a transparent display. In some embodiment, the video content 304 of the first media content 302 or the second media content 316 may be rendered on the display device 410.

The speaker 412 may include suitable logic, circuitry, and interfaces that may be configured to playback an audio output. The speaker 412 may be configured to receive electrical audio signals from the processor 404 or circuitry 402 and convert the received electrical audio signals into the audio/sound output. In some embodiments, the speaker 412 may be integrated with the media device 106 and may be an internal component of the media device 106. In some embodiments, the speaker 412 may be positioned outside the media device 106. Examples of the speaker 412 may include, but are not limited to, a loudspeaker, a woofer, a sub-woofer, a tweeter, a wireless speaker, a monitor speaker, or other speakers or sound output device. In some embodiment, the audio content 306 of the first media content 302 or the second media content 316 may be rendered on the speaker 412.

The image capturing device 416 may include suitable logic, circuitry, and interfaces that may be configured to capture an image/a plurality of images of a viewer/listener (e.g., a user 504, as shown in FIG. 5) of the media device 106. Examples of the image capturing device 416 may include, but are not limited to, an image sensor, a wide-angle camera, an action camera, a closed-circuit television (CCTV) camera, a camcorder, a digital camera, camera phones, a time-of-flight camera (ToF camera), a night-vision camera, and/or other image capture devices. In certain embodiments, the image capturing device 416 may be integrated in the media device 106. In some embodiments, the image capturing device may lie outside the media device 502 and/or may be mounted on the media device 106.

The network interface 418 may comprise suitable logic, circuitry, interfaces, and/or that may be configured to facilitate communication between the media device 106 and the metadata server 102, via the first communication network 112. Further, the network interface 418 may be configured to facilitate communication between the media device 106 and the first set of electrical devices 108, via controller device 110 and/or the second communication network 114. In accordance with an embodiment, the network interface 418 may include two network interface portions, including a first interface portion to facilitate communication over the first communication network 112, and a second interface portion to facilitate communication over the second communication network 114. In accordance with an embodiment, the first communication network 112 and the second communication network 114 may correspond to the same network. The functions of the network interface 418 may be the same as the functions of the network interface 210 described, for example, in FIG. 2. Therefore, the description of the network interface 418 is omitted from the disclosure for the sake of brevity. The operations of the circuitry 402 are described in detail, for example in FIGS. 5 and 7.

FIG. 5 is a diagram that illustrates an exemplary scenario for control of electrical devices based on context information of media content by the media device, via a controller device, in accordance with an embodiment of the disclosure. FIG. 5 is described in conjunction with elements from FIGS. 1, 2, 3, and 4. With reference to FIG. 5, there is shown an exemplary scenario 500 that may include a media device 502 (such as a television (TV)) and a user (e.g., a user 504). The user 504 may be a viewer/listener of the media device 502. In FIG. 5, there is also shown, a first set of electrical devices (such as, the first set of electrical devices 108). The first set of electrical devices 108 shown in FIG. 5, may include, but are not limited to, a smart-sofa 506 (e.g. smart furniture), a smart light 508, a digital photo-frame 510, an electrical curtain (such as blinds 512), a smart wind-chime 514, an electrical toy (such as a cheer-maker toy 516, a robotic toy 520, a smart celebrity toy 524), a smart pod 518 (or smart speaker), an electrical vase 522, or an aroma dispenser 526. In some embodiments, each of the first set of electrical devices 108 may be an internet of things (IOT) device. In addition, in FIG. 5, there is further shown the image capturing device 416 associated with the media device 502. In certain embodiments, the image capturing device 416 may be integrated in the media device 502. In some embodiments, the image capturing device 416 may lie outside the media device 502 and/or may be mounted on the media device 502. In addition, in FIG. 5, there is further shown, the controller device 110 as described, for example in FIG. 1 and FIG. 4.

It may be noted that the media device 502 and the first set of electrical devices 108 shown in FIG. 5 are presented merely as an example of a media device and different electrical devices respectively. The present disclosure may be also applicable to other types of the media device (such as a sound system/sound bar) and other types of the electrical devices. A description of other types of the media device 502 and the first set of electrical devices 108 has been omitted from the disclosure for the sake of brevity. The number of electrical devices in the first set of electrical devices 108 shown in FIG. 5 is presented merely as an example. The first set of electrical devices 108 may include only one electrical device or more number of electrical devices, without a deviation from scope of the disclosure.

Further, the media device 502 may be communicatively coupled with the first set of electrical devices 108, via the controller device 110 and the second communication network 114 (e.g., a home network, such as, a Wi-Fi network or a wired LAN network). In certain cases, the controller device 110 may be integrated within the media device 502. Alternatively, the controller device 110 may be implemented separate from the media device 502.

In operation, the media device 502 may generate the first request, which may include the identification information of the first media content 302. The media device 502 may be configured to transmit the first request to the metadata server 102, via the first communication network 112. In accordance with an embodiment, the metadata server 102 may generate the plurality of metadata, where each metadata may be generated with respect to a context of a corresponding segment of the plurality of segments of the first media content 302. The generation of the plurality of metadata based on the determined context information of the plurality of segments of the first media content 302 is described, for example, in FIG. 3.

The media device 502 may be further configured to receive the plurality of metadata from the metadata server 102 along with the first media content 302, as the second media content 316. Each metadata of the plurality of metadata may include the timing information (e.g., the timing information 312) and the context type information (e.g., the context type information 314). In some embodiments, the first media content 302 and the plurality of metadata related with the first media content 302 may be pre-stored in the memory 406 as the second media content 316. The circuitry 402 may be configured to receive a user input from the user 504 to playback the first media content 302. In an embodiment, the first media content 302 may be related to a broadcast program (for example TV program) available on a predefined channel indicated in the user input received from the user 504.

The media device 502 may playback the received first media content 302 (which may include the plurality of segments, including the first segment 302A) and simultaneously control (via the controller device 110) the first set of electrical devices 108 based on the received plurality of metadata. In some embodiments, to playback the first media content 302, the media device 502 may be configured to extract each metadata from the plurality of metadata and the corresponding segment in the received first media content 302. The media device 502 may playback the corresponding segment in synchronization with the control of the first set of electrical devices 108 based on the timing information 312, the context type information 314, and the subscription information associated with each of the first set of electrical devices 108. To control the first set of electrical devices 108, the media device 502 may transmit one or more trigger commands or control instructions to the first set of electrical devices, via the controller device 110, through the second communication network 114. The trigger commands or the control instructions may include the timing information 312 and the context type information 314 for a particular segment to be played or currently being played by the media device 106. In some embodiments, the timing information 312 and the context type information 314 may be transmitted only to those electrical devices that may have subscribed to certain context (as indicated by the context type information 314).

For example, in case, the circuitry 202 of the metadata server 102 determines the context information (i.e. context type information 314) of the first segment 302A as a romantic scene context, the media device 502 may playback the first segment 302A and simultaneously control (i.e. directly or via the controller device 110) the electrical devices (such as, smart light 508 and blinds 512 subscripted to the romantic context) to operate based on the corresponding metadata generated for the first segment 302A, as discussed, for example in FIG. 3. The media device 502 may similarly control the first set of electrical devices 108 in synchronization with the playback of the first media content 302 on the media device 502, based on the plurality of metadata associated with the first media content 302.

For example, the smart light 508, the digital photo-frame 510, the blinds 512, and the smart wind-chime 514 are subscribed to operate for a romantic context (i.e. as indicated in the subscription information). In the case of determination of the romantic scene context (i.e. context type information 314 included in the first metadata 310), the media device 502 during the playback of corresponding segment, may simultaneously control, via the controller device 110, the smart light 508, the digital photo-frame 510, the blinds 512, and the smart wind-chime 514 to operate for the romantic scene context determined from the corresponding segment (such the first segment 302A). For example, during the romantic scene context, the subscribed smart light 508 may produce dim lights of a certain color and the digital photo-frame 510 may display images which may be liked or preferred by the user 504 (i.e. the viewer/listener of the media device 502) Further, the blinds 512 may operate in a "closed state", so as to reduce an ambient light in a surrounding of the user 504. In addition, the smart wind-chime 514 may produce soothing sounds for the user 504. Thus, the simultaneous playback of a media segment and the control of the first set of electrical devices 108 based on the context information associated with the media segment (for example the first segment 302A), may further enhance a user-experience of a viewer/listener (e.g., the user 504) of the media device 106 during the play-back of the media segment. For example, the controlled electrical devices (such as, the smart light 508, the digital photo-frame 510, the blinds 512, and the smart wind-chime 514) may express or resonate a romantic mood or emotion and may provide an immersive experience to the user 504.

In another example, in case, the first segment 302A is determined to be of a sports scene context, the media device 502 may control (via the controller device 110) the cheer-maker toy 516 to dance or make cheering/clapping sounds, in case the cheer-maker toy 516 is subscribed to the sports scene context. Similarly, in another example, the media device 502 may control (via the controller device 110) the robotic toy 520 to mimic one or more characters being portrayed in the first segment 302A for a particular context (for example, a comedy scene context), in case the robotic toy 520 is subscribed to the particular context. In another example, the media device 502 may control the smart pod 518 (i.e. subscribed to a particular context) to provide trivia related to the particular context of the first segment 302A, which may be currently played-back on the media device 502. In another example, in case the first segment 302A or other segment is of an action or fight sequence context, the media device 502 may control (via the controller device 110) the smart celebrity toy 524 to perform one or more stunt actions, in case the smart celebrity toy 524 is subscribed to the action or fight sequence context as indicated by the subscription information related to the smart celebrity toy 524.

In accordance with an embodiment, the circuitry 402 of the media device 502 may be configured to compare the subscription information of a particular electrical device and the context type information 314 included in the first metadata 310, and further control (or provide commands) to the electrical device subscripted to the context which may be mentioned in the context type information 314 included in the first metadata 310. For example, in case, the context type information 314 included in the first metadata 310 indicate that the context of the first segment 302A is action or fight sequence context, and the subscription information of the smart celebrity toy 524 indicate that the smart celebrity toy 524 is subscribed to the action or fight sequence context, then the media device 106 may provide command instruction (either directly or via the controller device 110) to the smart celebrity toy 524 to perform one or more actions or stunt predefined in the smart celebrity toy 524. In some embodiments, the provided command instruction may be to turn-on or turn-off the particular electrical device. In other embodiments, the command instruction may include information about an operational mode of the controlled electrical device, in case the electrical device may be operable in multiple operational modes. In some embodiments, the media device 502 may provide the context type information 314 (i.e. included in the received first metadata 310 of a particular segment, such as the first segment 302A) to each of the first set of electrical devices 108 coupled with the media device 502. Each of the first set of electrical devices 108 may be configured to receive the context type information 314 (i.e. indicate the context of the particular segment) and operate in case the corresponding electrical device is subscribed or capable to the context indicated by the context type information 314. In case, a particular electrical device is not capable or subscribed to the context indicated by the context type information 314, that electrical device may ignore the context information received from the media device 502 and may not operate based on the corresponding predefined operations.

In accordance with an embodiment, the circuitry 402 of the media device 502 may be configured to receive one or more user inputs from the user 504 during the playback of the first media content 302. The user inputs may correspond to different operations (such as pause, play, stop, move forward, move reverse, seek) with the render of the first media content 302. Based on the receipt of the user inputs, the circuitry 402 may be further configured to control the playback of the first media content 302 and, accordingly extract the metadata of the corresponding segment (to be rendered) and control the first set of electrical devices 108, via the controller device 110, based on the extracted metadata so that the first set of electrical devices 108 may be controlled in synchronization with the playback of the first media content 302 on a real-time basis. In case, the one or more user input indicates a change in the content channel, the circuitry 402 may extract the first media content 302 related to the changed content channel (for example TV channel) and accordingly control the first set of electrical devices 108, via the controller device 110, based on the plurality of metadata related with the extracted second media content 316.

In accordance with an embodiment, during the playback of the first media content 302 and the control of the first set of electrical devices 108, the media device 502 may control the image capturing device 416 to capture one or more images of one or more viewers/listeners (such as the user 504) who may be present in a field-of-view of the image capturing device 416. The control of the image capturing device 416 may be based on the control of the first set of electrical devices 108 in synchronization with the playback of the first media content 302 on the media device 502. The media device 502 may be further configured to determine an emotional state of the one or more viewers/listeners (e.g., the user 504) from the captured one or more images based on one or more facial detection techniques. The captured one or more images may be utilized to determine a facial expression of the user 504. The facial expression may indicate one or more motions or positions of muscles of a face of the user 504, where the facial expressions may manifest an emotion. The muscles of the face may move the skin of the user 504, may create facial lines/folds, or may cause the movement of facial features, such as mouth, head, nose, eye, eyebrows of the user 504. The media device 502 may be configured to determine the emotional state of the user 504 based on the determined facial expression of the user 504. The plurality of categories of user emotions may include, but are not limited to, a happy emotion, a sad emotion, an angry emotion, a calm emotion, a fear emotion, a neutral emotion, an excited emotion, a confused emotion, a stressed emotion, a disgusted emotion, a surprised emotion, an excitement emotion, or a scared emotion.

The media device 502 may be configured to update the one or more metadata from the plurality of metadata based on the determined emotional state of the one or more viewers/listeners (i.e. the user 504). In some embodiments, the media device 502 may be configured to send a metadata update request (which may include the determined emotional state with respect to a particular segment of the first media content 302) to the metadata server 102. The metadata server 102 may update the metadata corresponding to the particular segment based on the received request. For example, the media device 502 may detect that the user 504 has a negative emotion (e.g., a sad emotion) during the playback of the first segment 302A. The media device 502 may send the metadata update request to the metadata server 102 to update the first metadata 310 such that the updated first metadata 310 may include the updated context type information 314 associated with the first segment 302A that may be synchronous with the emotion expressed by the user 504. The updated context type information 314 may better represent the context of the first segment 302A being played back by the media device 502 and appropriate control the electrical device subscripted to the updated context.

In an accordance with an embodiment, a second set of electrical devices (not shown in FIG. 5) may be coupled to the controller device 110, in addition to the first set of electrical devices 108, in real-time. The second set of electrical devices may correspond to new electrical devices that may be connected to the controller device 110, via the second communication network 114. Upon connection with the controller device 110 or directly with the media device 502, each of the second set of electrical devices may transmit a request for subscription to one or more context types associated with the media content. The request may be sent to the controller device 110 or to the media device 502. The request for subscription of an electrical device may include the subscription information that may indicate a subscription of the electrical device to a particular context type. Further, when the media device 502 receives the first metadata 310 including timing information 312 and the context type information 314, the media device 106 may transmit the first metadata 310 to the controller device 110. The controller device 110 may further transmit the first metadata 310 to the electrical devices of the first set of electrical devices 108 and the second set of electrical devices based on the context type subscribed by each electrical device (as per the subscription information of the electrical device) and the context type information 314. Thus, a new electrical device which may be coupled to the controller device 110, may receive the first metadata 310 if the context type subscribed by the new electrical device coincides with one of the context types in the context type information 314 in the first metadata 310. Accordingly, the controller device 110 or the media device 502 may control the new electrical device without any changes in the first metadata 310, thereby making the use of the first metadata 310 scalable with respect to the number and type of electrical devices to be controlled based on the first metadata 310.

In accordance with an embodiment, a media service provider (associated with the metadata server 102) may provide multiple versions of the second media content 316 (such as, a movie or game title) to a consumer (e.g., the user 504 who may use the media device 502). Each version of the second media content 316 may correspond to the same first media content 302, however, with a particular metadata version. In an embodiment, the metadata of various versions may be of varying precision and accuracy with respect to the timing information 312 and context type information 314 associated with the metadata. Further, the metadata may be bound to particular media content based on a digital rights management identifier (ID) or a similar unique ID for media content. Thus, the consumer may purchase a version of the second media content 316 that meets his/her need, based on whether he/she uses the required electrical devices that may respond to the corresponding version of the metadata. Further, the media service provider may incrementally provide additional versions of the second media content 316 with associated metadata with greater precision and accuracy associated with the timing information 312 and the context type information 314. In addition, a first service provider may provide the first media content 302 (without the plurality of metadata), while a second service provider (e.g., a partner/vendor associated with the first service provider or a third-party) may provide metadata of a particular version (or multiple versions), related to the first media content 302. Further, a third service provider may provide one or more electrical devices that may support one or more available versions of the metadata. Thus, the disclosed metadata server 102, the media device 502, and the first set of electrical devices 108 may provide an open-ecosystem for development of electrical devices and supported metadata, for continues enhancement of consumer's experience with media content playback.

Figure 6:
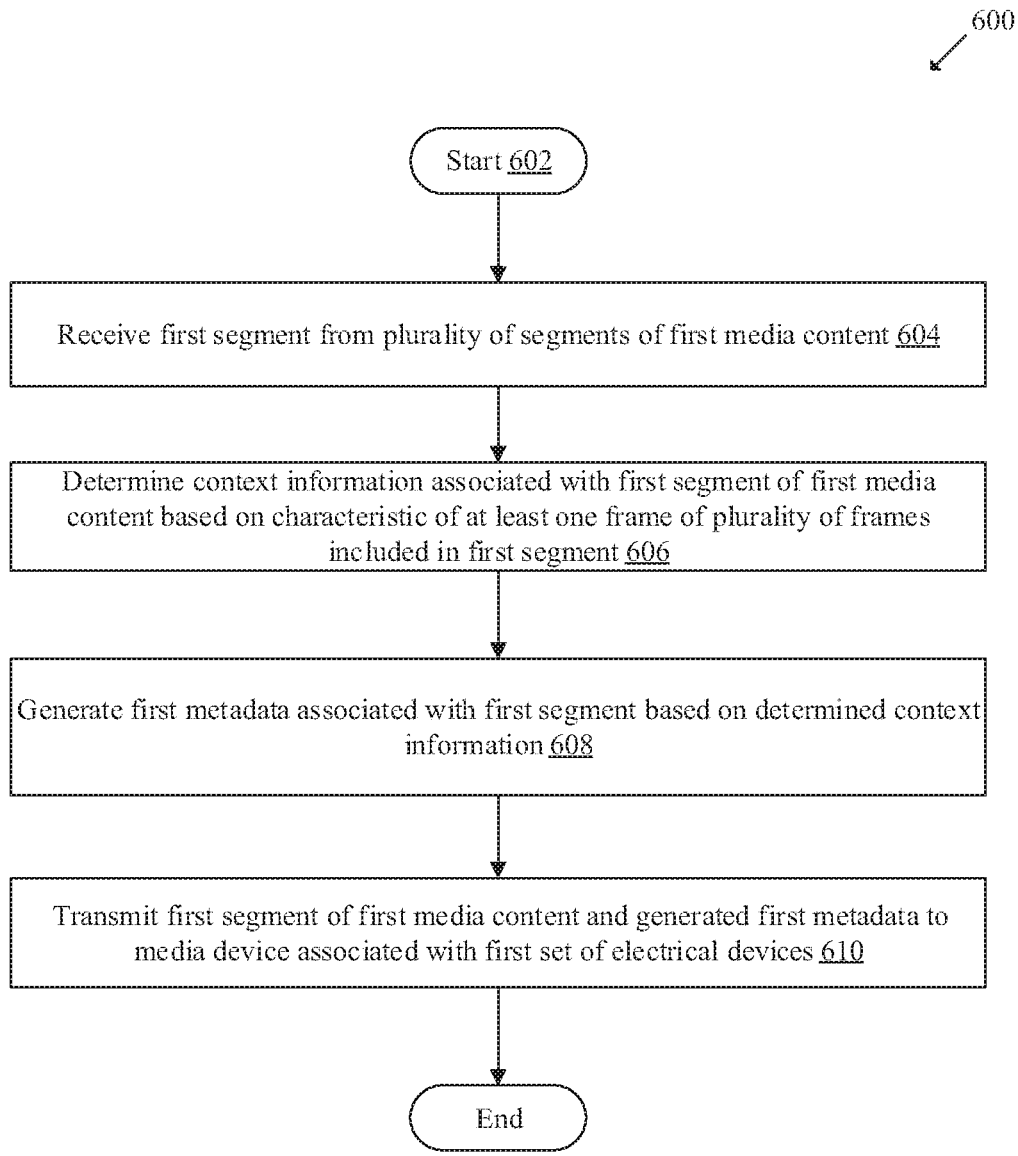
FIG. 6 is a flowchart that illustrates a first exemplary method to generate metadata information for control of electrical devices based on context information of media content, in accordance with an embodiment of the disclosure.

FIG. 6 is a flowchart that illustrates a first exemplary method to generate metadata information for control of electrical devices based on context information of media content, in accordance with an embodiment of the disclosure. FIG. 6 is described in conjunction with elements from FIGS. 1, 2, 3, 4, and 5. With reference to FIG. 6, there is shown a flowchart 600. The operations of the flowchart 600 may be executed a computing system, such as the metadata server 102 or the circuitry 202. The operations may start at 602 and proceed to 604.

At 604, the first segment 302A may be received from the plurality of segments of the first media content 302. The circuitry 202 may be configured to receive the first segment 302A of the first media content 302 from the memory 206 or from another server (e.g., a media server not shown in FIG. 1). In accordance with an embodiment, the receipt of the first segment 302A may further include extraction of the plurality of frames from the first segment 302A of the first media content 302.

At 606, the context information associated with the first segment 302A of the first media content 302 may be determined based on a characteristic of the at least one frame of the plurality of frames included in the first segment 302A. In one or more embodiments, the circuitry 202 may be configured to determine the context information associated with the first segment 302A based on the characteristic of the at least one frame of the plurality of frames included in the first segment 302A. In accordance with an embodiment, the circuitry 202 may determine the characteristic of the at least one frame of the plurality of frames in the first segment 302A and may apply the ML model 104 on the determined characteristic of the at least one frame of the first segment 302A to determine the context information associated with the first segment 302A. The determination of the context information of the first segment 302A is described, for example, in FIG. 3.

At 608, the first metadata 310 associated with the first segment 302A may be generated based on the determined context information. In one or more embodiments, the circuitry 202 may be configured to generate the first metadata 310 associated with the first segment 302A based on the determined context information. In accordance with an embodiment, the first metadata 310 may include the timing information (such as the timing information 312) and the context type information (such as the context type information 314) to control the first set of electrical devices 108. The generation of the first metadata 310 is described, for example, in FIG. 3.

At 610, the first segment 302A of the first media content 302 and the generated first metadata 310 may be transmitted to the media device 106 (or the media device 502) associated with the first set of electrical devices 108. The circuitry 202 may be configured to transmit the first segment 302A of the first media content 302 and the generated first metadata 310 to the media device 106 (or the media device 502). On receipt of the first segment 302A and the first metadata 310, the media device 106 (or the media device 502) may playback the first segment 302A and simultaneously control, via the controller device 110, the first set of electrical devices 108 based on the generated first metadata 310. The control of the first set of electrical devices 108 is described, for example, in FIGS. 3 and 5. The control may pass to end.

Although the flowchart 600 is illustrated as discrete operations, such as 602, 604, 606, 608, and 610, the disclosure is not so limited. Accordingly, in certain embodiments, such discrete operations may be further divided into additional operations, combined into fewer operations, or eliminated, depending on the particular implementation without detracting from the essence of the disclosed embodiments.

Figure 7:
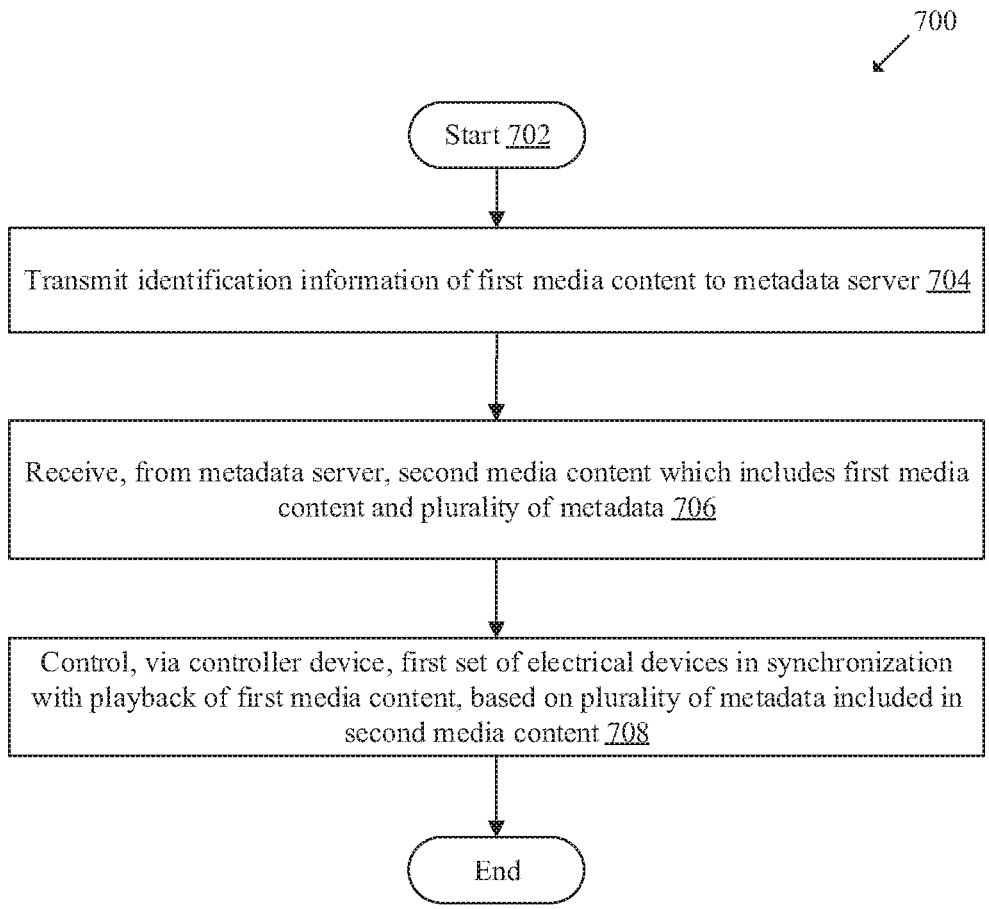
FIG. 7 is a flowchart that illustrates a second exemplary method for control of electrical devices based on context information of media content, in accordance with an embodiment of the disclosure.

FIG. 7 is a flowchart that illustrates a second exemplary method for control of electrical devices based on context information of media content, in accordance with an embodiment of the disclosure. FIG. 7 is described in conjunction with elements from FIGS. 1, 2, 3, 4, 5 and 6. With reference to FIG. 7, there is shown a flowchart 700. The operations of the flowchart 700 may be executed a computing system, such as the media device 106, the media device 502, or the circuitry 402. The operations may start at 702 and proceed to 704.

At 704, the identification information of the first media content 302 may be transmitted to the metadata server 102. In one or more embodiments, the circuitry 402 of the media device 106 or the media device 502 may be configured to transmit the first request to the metadata server 102. The first request may include the identification information of the first media content 302. The identification information may include a file name of the first media content and/or a memory storage location of the first media content 302 on the memory 206 of the metadata server 102.

At 706, the second media content 316 may be received from the metadata server 102. In one or more embodiments, the circuitry 402 may be configured to receive the second media content 316 from the metadata server 102. The second media content 316 may include the first media content 302 and the plurality of metadata. Each of the plurality of metadata may be associated with a corresponding segment, from the plurality of segments of the first media content 302. For instance, the plurality of metadata may include the first metadata 310 that is associated with the first segment 302A of the first media content 302. In an alternate scenario, the circuitry 402 may receive the plurality of metadata from the metadata server 102 and may receive the first media content 302 from another server (such as a media server; not shown in FIG. 1). The generation of each metadata and the generation of the plurality of metadata are described, for example, in FIG. 3.

At 708, the first set of electrical devices 108 may be controlled, via the controller device 110, in synchronization with playback of the second media content 316 based on the plurality of metadata in the second media content 316. In one or more embodiments, the circuitry 402 may be configured to control the first set of electrical devices 108, via the controller device 110, in synchronization with the playback of the second media content 316 (or the first media content 302) on the I/O device 408, based on the plurality of metadata. Each metadata (e.g., the first metadata 310) may include the timing information (e.g., the timing information 312) and the corresponding context type information (e.g., the context type information 314). The control of the first set of electrical devices 108 may be based on the timing information 312 and the context type information 314 in each metadata. The context type information 314 may indicate the context determined for the corresponding segment of the first media content 302. The control of the first set of electrical devices 108 is described, for example, in FIGS. 1, 3, and 5. The control may pass to end.

Although the flowchart 700 is illustrated as discrete operations, such as 702, 704, 706, and 708, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory, computer-readable medium and/or storage medium, and/or a non-transitory machine readable medium and/or storage medium stored thereon, instructions executable by a machine and/or a computer, such as, a metadata server. At least one code section in the instructions may cause the machine and/or computer to perform operations that include receipt of a first segment from the plurality of segments of first media content. The operations may further include determination of context information associated with the first segment of the first media content based on a characteristic of at least one frame of a plurality of frames included in the first segment. Further, the operations may include generation of first metadata associated with the first segment based on the determined context information. The first metadata may include timing information corresponding to the determined context information to control a first set of electrical devices. In addition, the operations may include transmission of the received first segment of the first media content and the determined first metadata to a media device associated with the first set of electrical devices.

Exemplary aspects of the disclosure may include a metadata server (such as the metadata server 102) configured to store a Machine learning (ML) model (such as the ML model 104). The metadata server 102 may include circuitry (such as the circuitry 202). The circuitry 202 may be configured to receive a first segment (such as the first segment 302A) from a plurality of segments of a first media content (such as the first media content 302). The circuitry 202 may be further configured to determine context information associated with the first segment 302A of the first media content 302 based on a characteristic of at least one frame of a plurality of frames included in the first segment 302A. Further, the circuitry 202 may be configured to generate first metadata (such as the first metadata 310) associated with the first segment 302A based on the determined context information. The first metadata 310 may include timing information (such as the timing information 312) corresponding to the determined context information to control a first set of electrical devices (such as the first set of electrical devices 108). The circuitry 202 may be further configured to transmit the first segment 302A of the first media content 302 and the generated first metadata 310 to a media device (such as the media device 106) associated with the first set of electrical devices 108.

In certain embodiments, the circuitry 202 of the metadata server 102 may be configured to transmit, to a media server, a request which includes identification information of the first media content 302. Based on the request, the circuitry 202 may receive the first media content 302 including the first segment 302A. The circuitry 202 may further generate the first metadata 310 associated with the first segment 302A based on the received first media content 302. The circuitry 202 may then transmit the received first segment 302A of the first media content 302 and the generated first metadata 310 to the media device 106.

In one or more embodiments, the circuitry 202 may be further configured to apply one or more machine learning models on the characteristic of at least one frame of the plurality of frames included in the first segment 302A to determine the context information associated with the first segment 302A.

In an embodiment, the circuitry 202 may be configured to retrieve the plurality of segments from the first media content 302 and generate a plurality of metadata. Each of the plurality of metadata may be associated with a corresponding segment from the plurality of segments. The circuitry 202 may be further configured to generate second media content (such as the second media content 316) from the first media content 302 based on the generated plurality of metadata.

In accordance with an embodiment, the first media content 302 may correspond to audio content. The context information of the audio content may comprise at least one of, but not limited to, a song, a musical tone, a monologue, a dialogue, a laughter sound, a distress sound, a pleasant sound, an unpleasant sound, an ambient noise, a background sound, a loud sound, or defined sound pattern associated with a real-time object. For audio content, the characteristic of at least one of the plurality of frames included in the first segment 302A may include at least one of, but not limited to, a loudness parameter, a pitch parameter, a tone parameter, a rate-of-speech parameter, a voice quality parameter, a phonetic parameter, an intonation parameter, an intensity of overtones, a voice modulation parameter, a pronunciation parameter, a prosody parameter, a timbre parameter, or one or more psychoacoustic parameters.

In accordance with an embodiment, the first media content 302 may correspond to video content or audio-video (AV) content. The context information of the video content or the AV content comprises at least one of, but not limited to, an action scene, a comedy scene, a romantic scene, a suspense scene, a horror scene, a drama scene, a poetry scene, a party scene, or a dance scene. For video content or audio-video (AV) content, the characteristic of at least one of the plurality of frames included in the first segment 302A corresponds to, but is not limited to, at least one of, an object recognized in the at least one frame, a person recognized in the at least one frame, an emotional state of at least one object in the at least one frame, background information of the at least one frame, an ambient lighting condition in the at least one frame, motion information of at least one object in the at least one frame, a gesture associated with at least one object in the at least one frame, or genre information associated with the at least one frame.

In accordance with an embodiment, the circuitry 202 may be further configured to identify a type of the first segment 302A of the first media content 302. The type of the first segment 302A comprises one of an audio type segment, a video type segment, an audio-video (AV) type segment, or a gaming type segment. The circuitry 202 may be configured to generate the first metadata 310 associated with the first segment 302A based on the identified type of the first segment 302A.

In one or more embodiments, the first set of electrical devices 108 may include, but is not limited to, an aroma dispenser, an electrical furniture, a lighting device, a sound reproduction device, an electrical curtain, an electrical toy, an electrical wind-chime, an electrical vase, a digital photoframe, or an internet of things (IOT) device.

In one or more embodiment, the first metadata 310 may include the timing information 312 and the determined context information (such as the context type information 314) of the first segment 302A of the first media content 302.

Various embodiments of the disclosure may provide a non-transitory, computer-readable medium and/or storage medium, and/or a non-transitory machine readable medium and/or storage medium stored thereon, instructions executable by a machine and/or a computer, such as, a media device. At least one code section of the instructions may cause the machine and/or computer to perform operations that include transmission of identification information of first media content to a metadata server. The first set of electrical devices may be communicatively coupled to the media device. The operations may further include reception, from the metadata server, second media content, which may include the first media content and a plurality of metadata. Each of the plurality of metadata may be associated with a corresponding segment, from the plurality of segments of the first media content. Each metadata may correspond to context information which may be associated with the corresponding segment and determined based on a characteristic of at least one frame of a plurality of frames included in the corresponding segment. The operations may further include control of the first set of electrical devices in synchronization with playback of the first media content on the media device based on the plurality of metadata.

Exemplary aspects of the disclosure may include a media device (such as the media device 106) configured to playback media content. The media device 106 may include a circuitry (such as the circuitry 402). The circuitry 402 may be configured to transmit identification information of the first media content 302 to the metadata server 102. The circuitry 402 may be further configured to receive second media content 316, which may include the first media content 302 and a plurality of metadata, from the metadata server 102. Each of the plurality of metadata may be associated with a corresponding segment, from the plurality of segments of the first media content 302. Each metadata may correspond to context information associated with a corresponding segment and determined based on a characteristic of at least one frame of a plurality of frames included in the corresponding segment. The circuitry 402 may be further configured to control the first set of electrical devices 108 in synchronization with playback of the first media content 302 on the media device 106 based on the plurality of metadata included in the second media content 316.

In accordance with an embodiment, each of the plurality of metadata (e.g., the first metadata 310) may include timing information (e.g., the timing information 312) and the context information (e.g., the context type information 314) associated with the corresponding segment based on which the first set of electrical devices 108 may be controlled. The circuitry 402 may be further configured to control the first set of electrical devices 108, via a controller device (such as the controller device 110) which may be communicatively coupled to the media device 106 and each of the first set of electrical devices 108.

The circuitry 402 may be configured to receive subscription information associated with each of the first set of electrical devices 108. The subscription information may indicate a subscription between the corresponding electrical device with the context information included in the corresponding metadata received from the metadata server 102. The circuitry 402 may be further configured to control the first set of electrical devices 108 based on each metadata and the subscription information associated with each of the first set of electrical devices 108.

In one or more embodiments, the media device 106 may further comprise an image capturing device (such as the image capturing device 416). The circuitry 402 may be further configured to control the image capturing device 416 to capture one or more images of one or more viewers/listeners in a field-of-view of the image capturing device 416. The control of the image capturing device 416 may be based on the control of the first set of electrical devices 108 in synchronization with the playback of the first media content 302. The circuitry 402 may be further configured to determine an emotional state of the one or more viewers/listeners of the media device 106 (or the media device 502), from the captured one or more images and may update the plurality of metadata based on the determined emotional state.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. A metadata server, comprising:
circuitry configured to:
  receive a first segment from a plurality of segments of first media content;
  determine first context information and second context information associated with the first segment of the first media content based on a plurality of characteristics of at least one frame of a plurality of frames in the first segment;
  generate first metadata associated with the first segment based on the determined first context information and the second context information, wherein
    the first metadata includes a first sub-metadata and a second sub-metadata,
    the first sub-metadata includes first timing information corresponding to the first context information,
    the second sub-metadata includes second timing information corresponding to the second context information,
    the first context information is different from the second context information,
    the first timing information indicates a first time at which a first electrical device is controllable by a media device during playback of the first segment of the first media content by the media device, and
    the second timing information indicates a second time at which a second electrical device, different from the first electrical device, is controllable by the media device during the playback of the first segment of the first media content by the media device; and
  transmit the received first segment of the first media content and the generated first metadata to the media device.

2. The metadata server according to claim 1, wherein the circuitry is further configured to:
  transmit, to a media server, a first request which includes identification information of the first media content;
  receive, from the media server, the first media content including the first segment, based on the first request;
  generate the first metadata associated with the first segment based on the received first media content; and
  transmit the received first segment of the first media content and the generated first metadata to the media device.

3. The metadata server according to claim 1, wherein the circuitry is further configured to apply at least one machine learning model on the plurality of characteristics of the at least one frame of the plurality of frames in the first segment to determine the first context information and the second context information associated with the first segment.

4. The metadata server according to claim 1, wherein the circuitry is further configured to:
  retrieve the plurality of segments of the first media content;
  generate a plurality of metadata based on the first context information associated with a corresponding segment of the plurality of segments, wherein each of the plurality of metadata is associated with the corresponding segment of the plurality of segments; and
  generate second media content from the first media content based on the generated plurality of metadata.

5. The metadata server according to claim 4, wherein
the circuitry is further configured to generate a plurality of versions of the second media content,
each version of the plurality of versions corresponds to a specific version of metadata, and
the specific version of the metadata is selectable based on usage of electrical devices controllable at a user premises.

6. The metadata server according to claim 1, wherein
the first media content corresponds to audio content, and
the first context information of the audio content comprises at least one of a song, a musical tone, a monologue, a dialogue, a laughter sound, a distress sound, a pleasant sound, an unpleasant sound, an ambient noise, a background sound, a loud sound, or defined sound pattern associated with a real-time object.

7. The metadata server according to claim 1, wherein
the first media content corresponds to video content or audio-video (AV) content, and
the first context information of the video content or the AV content comprises at least one of an action scene, a comedy scene, a romantic scene, a suspense scene, a horror scene, a drama scene, a poetry scene, a party scene, or a dance scene.

8. The metadata server according to claim 1, wherein
the first media content corresponds to audio content, and
the plurality of characteristics of the at least one frame in the first segment of the audio content comprises at least one of a loudness parameter, a pitch parameter, a tone parameter, a rate-of-speech parameter, a voice quality parameter, a phonetic parameter, an intonation parameter, an intensity of overtones, a voice modulation parameter, a pronunciation parameter, a prosody parameter, a timbre parameter, or at least one psychoacoustic parameter.

9. The metadata server according to claim 1, wherein
the first media content corresponds to video content or audio-video (AV) content, and
the plurality of characteristics of the at least one frame in the first segment of the video content or the AV content corresponds to at least one of an object recognized in the at least one frame, a person recognized in the at least one frame, an emotional state of at least one object in the at least one frame, background information of the at least one frame, an ambient lighting condition in the at least one frame, motion information of the at least one object in the at least one frame, a gesture associated with the at least one object in the at least one frame, or genre information associated with the at least one frame.

10. The metadata server according to claim 1, wherein the circuitry is further configured to:
identify a type of the first segment of the first media content, wherein the type of the first segment comprises one of an audio type segment, an audio-video (AV) type segment, or a gaming type segment; and
generate the first metadata associated with the first segment based on the identified type of the first segment.

11. The metadata server according to claim 1, wherein each of the first electrical device and the second electrical device comprises at least one of an aroma dispenser, an electrical furniture, a lighting device, a sound reproduction device, an electrical curtain, an electrical toy, an electrical wind-chime, an electrical vase, a digital photo-frame, or an internet of things (IOT) device.

12. The metadata server according to claim 1, wherein the circuitry is further configured to:
recognize a profession of each of one or more persons in the at least one frame based on stored profile information of the one or more persons; and
determine one of the first context information or the second context information based on an action performed by the recognized profession of the one or more persons.

13. A media device, comprising:
circuitry configured to:
transmit identification information of first media content to a metadata server;
receive, from the metadata server, second media content which includes the first media content and a plurality of metadata, wherein
at least one metadata of the plurality of metadata includes a first sub-metadata and a second sub-metadata,
the first sub-metadata includes first timing information corresponding to first context information,
the second sub-metadata includes second timing information corresponding to second context information, and
the first context information is different from the second context information;
control, at a first time, a first electrical device in synchronization with playback of the first media content based on the first timing information; and
control, at a second time, a second electrical device in synchronization with the playback of the first media content based on the second timing information.

14. The media device according to claim 13, wherein the circuitry is further configured to control the first electrical device and the second electrical device, via a controller device which is communicatively coupled to the media device and each of the first electrical device and the second electrical device.

15. The media device according to claim 13, wherein
the circuitry is further configured to receive subscription information from each of the first electrical device and the second electrical device, and
the subscription information indicates a subscription between a corresponding electrical device of the first electrical device and the second electrical device with one of the first context information and the second context information included in a corresponding metadata of the plurality of metadata received from the metadata server.

16. The media device according to claim 15, wherein the circuitry is further configured to control the first electrical device and the second electrical device based on the at least one metadata and the subscription information associated with each of the first electrical device and the second electrical device.

17. The media device according to claim 13, further comprising an image capturing device,
wherein the circuitry is further configured to:
control the image capturing device to capture at least one image of at least one viewer, in a field-of-view of the image capturing device, based on the control of the first electrical device and the second electrical device in synchronization with the playback of the first media content;
determine an emotional state of the at least one viewer from the captured at least one image; and
update the plurality of metadata based on the determined emotional state.

18. The media device according to claim 13, wherein each of the first electrical device and the second electrical device comprises at least one of an aroma dispenser, an electrical furniture, a lighting device, a sound reproduction device, an electrical curtain, an electrical toy, an electrical wind-chime, an electrical vase, a digital photo-frame, or an internet of things (IOT) device.

19. A method, comprising:
in a metadata server:
receiving a first segment from a plurality of segments of first media content;
determining first context information and second context information associated with the first segment of the first media content based on a plurality of characteristics of at least one frame of a plurality of frames in the first segment;
generating first metadata associated with the first segment based on the determined first context information and the second context information, wherein
the first metadata includes a first sub-metadata and a second sub-metadata,
the first sub-metadata includes first timing information corresponding to the first context information,
the second sub-metadata includes second timing information corresponding to the second context information,
the first context information is different from the second context information,
the first timing information indicates a first time at which a first electrical device is controllable by a media device during playback of the first segment of the first media content by the media device, and
the second timing information indicates a second time at which a second electrical device, different from the first electrical device, is controllable by the media device during the playback of the first segment of the first media content by the media device; and
transmitting the received first segment of the first media content and the generated first metadata to the media device.

20. A method, comprising:
in a media device:
transmitting identification information of first media content to a metadata server;
receiving, from the metadata server, second media content which includes the first media content and a plurality of metadata, wherein
at least one metadata of the plurality of metadata includes a first sub-metadata and a second sub-metadata,
the first sub-metadata includes first timing information corresponding to first context information,
the second sub-metadata includes second timing information corresponding to second context information, and
the first context information is different from the second context information;
controlling, at a first time, a first electrical device in synchronization with playback of the first media content based on the first timing information; and
controlling, at a second time, a second electrical device in synchronization with the playback of the first media content based on the second timing information.

* * * * *